(12) United States Patent
Lee et al.

(10) Patent No.: US 11,032,009 B1
(45) Date of Patent: Jun. 8, 2021

(54) METHOD AND APPARATUS FOR GENERATING SIGNAL OF USER EQUIPMENT AND BASE STATION IN WIRELESS COMMUNICATION SYSTEM

(71) Applicants: LG ELECTRONICS INC., Seoul (KR); KOREA ADVANCED INSTITUTE OF SCIENCE AND TECHNOLOGY, Daejeon (KR)

(72) Inventors: Hojae Lee, Seoul (KR); Sangrim Lee, Seoul (KR); Kyungmin Woo, Seoul (KR); Hoon Kim, Seoul (KR)

(73) Assignees: LG ELECTRONICS INC., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 16/937,506

(22) Filed: Jul. 23, 2020

(51) Int. Cl.
*H04B 10/00* (2013.01)
*H04B 10/516* (2013.01)
*H04B 10/11* (2013.01)
*H04B 10/60* (2013.01)
*H04W 88/08* (2009.01)
*H04W 88/02* (2009.01)

(52) U.S. Cl.
CPC .......... *H04B 10/516* (2013.01); *H04B 10/11* (2013.01); *H04B 10/60* (2013.01); *H04W 88/02* (2013.01); *H04W 88/08* (2013.01)

(58) Field of Classification Search
CPC .......... H04B 10/2575; H04B 10/25752; H04B 10/25753; H04B 10/25759; H04B 10/25754; H04B 10/516; H04B 10/572; H04B 10/548; H04B 10/532; H04B 10/40; H04B 10/564; H04B 10/6162; H04B 10/6166
USPC ....... 398/115, 116, 183, 188, 186, 187, 201, 398/193, 194, 195, 202, 208, 66, 67, 158, 398/159, 135, 136, 68
See application file for complete search history.

(56) References Cited

U.S. PATENT DOCUMENTS

| | | | | |
|---|---|---|---|---|
| 2015/0110494 A1* | 4/2015 | Ghelfi | ............... | H04B 10/00 398/115 |
| 2015/0207567 A1* | 7/2015 | Bogoni | ............... | H04B 10/64 398/115 |
| 2020/0076511 A1* | 3/2020 | Lim | ............... | H04B 10/6164 |

* cited by examiner

*Primary Examiner* — Hanh Phan
(74) *Attorney, Agent, or Firm* — Lee Hong Degerman Kang Waimey

(57) ABSTRACT

Disclosed herein is a method of transmitting a signal of a user equipment (UE) in a wireless communication system. The method includes generating an optical signal related to data transmission, combining an electrical signal for the data with the optical signal, and transmitting a combined signal.

8 Claims, 37 Drawing Sheets

(control plane)

(user plane)

(A)

METHOD AND APPARATUS FOR GENERATING SIGNAL OF USER EQUIPMENT AND BASE STATION IN WIRELESS COMMUNICATION SYSTEM

BACKGROUND OF THE INVENTION

1. Field of the Invention

The present disclosure relates to a wireless communication system and, more particularly, to a method and apparatus for generating and transmitting a sub-teraherz (sub-THz) by a user equipment in a wireless communication system.

In particular, the present disclosure relates to a method of, by a user equipment, generating and transmitting a sub-THz band ultrahigh-speed signal based on an optical device.

2. Description of the Related Art

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY OF THE INVENTION

An object of the present disclosure devised to solve the problem lies in a method and apparatus for generating signals of a user equipment (UE) and a base station in a wireless communication system.

Another object of the present disclosure devised to solve the problem lies in a method and apparatus for generating sub-THz band signals based on an optical device by a user equipment (UE) and a base station in a wireless communication system.

Technical tasks obtainable from the present disclosure are not limited to the above-mentioned technical tasks, and other unmentioned technical tasks can be clearly understood from the following description by those having ordinary skill in the technical field to which the present disclosure pertains.

The aspects of the present disclosure are only a part of the preferred embodiments of the present disclosure, and various embodiments based on technical features of the present disclosure may be devised and understood by the person with ordinary skill in the art based on the detailed description of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DESCRIPTION OF THE PREFERRED EMBODIMENTS

Figure 1:
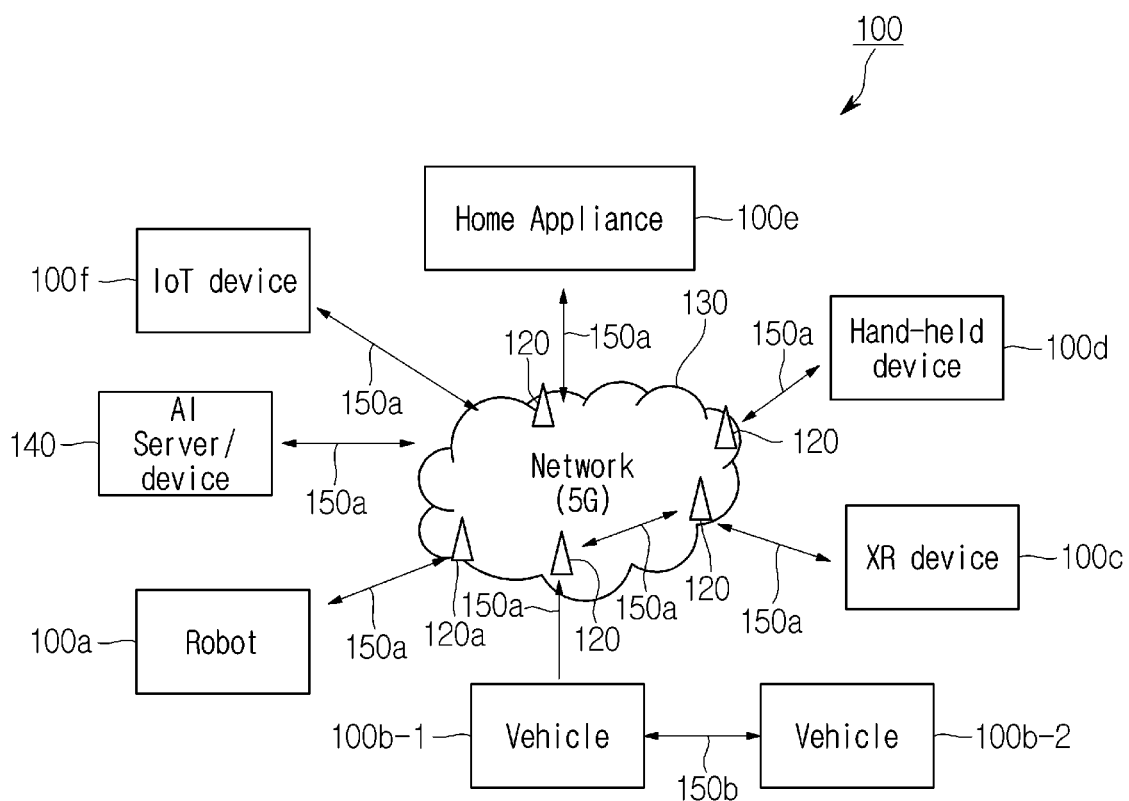
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, 3GPP $5^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5GNR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include a unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5GNR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
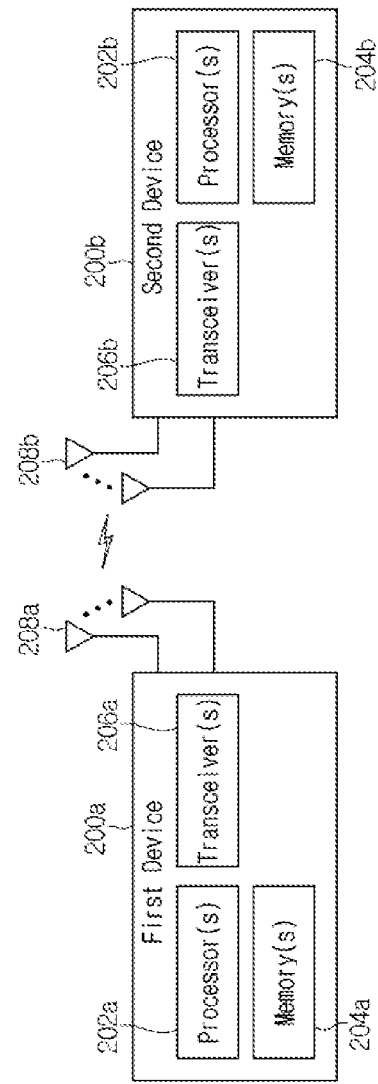
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. For example, one or more transceivers 206a and 206b may be connected with one or more processors 202a and 202b to transmit/receive radio signals. For example, one or more processors 202a and 202b may perform control such that one or more transceivers 206a and 206b transmit user data, control information or radio signals to one or more other apparatuses. In addition, one or more processors 202a and 202b may perform control such that one or more transceivers 206a and 206b receive user data, control information or radio signals from one or more other apparatuses. In addition, one or more transceivers 206a and 206b may be connected with one or more antennas 208a and 208b, and one or more transceivers 206a and 206b may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Structure of Wireless Device Applicable to the Present Disclosure

Figure 3:
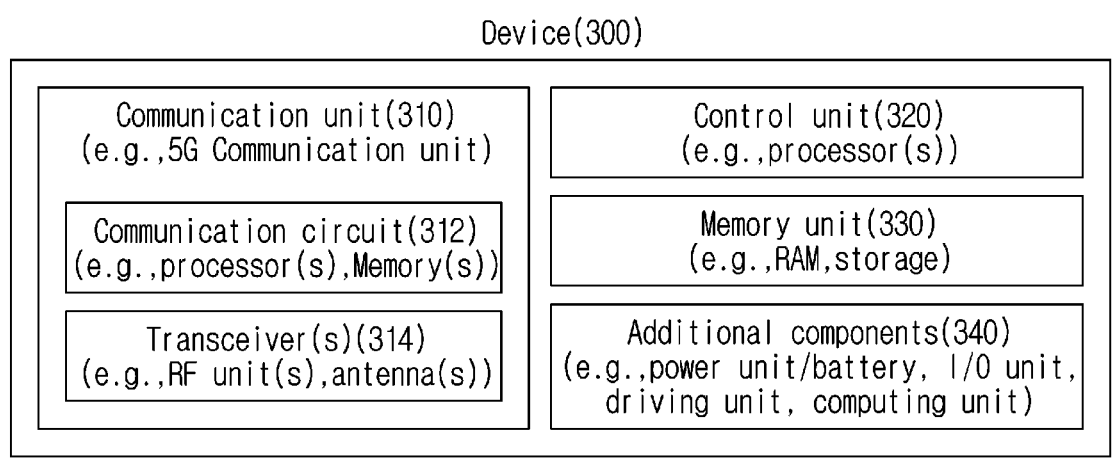
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically connected with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100a), the vehicles (FIG. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be connected with each other through wired interfaces or at least some thereof may be wirelessly connected through the communication unit 310. For example, in the wireless device 300, the control unit 320 and the communication unit 310 may be connected by wire, and the control unit 320 and the first unit (e.g., 130 or 140) may be wirelessly connected through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof Hand-Held Device Applicable to the Present Disclosure FIG. 4 is a view showing an example of a hand-held device applicable to the present disclosure.

Figure 4:
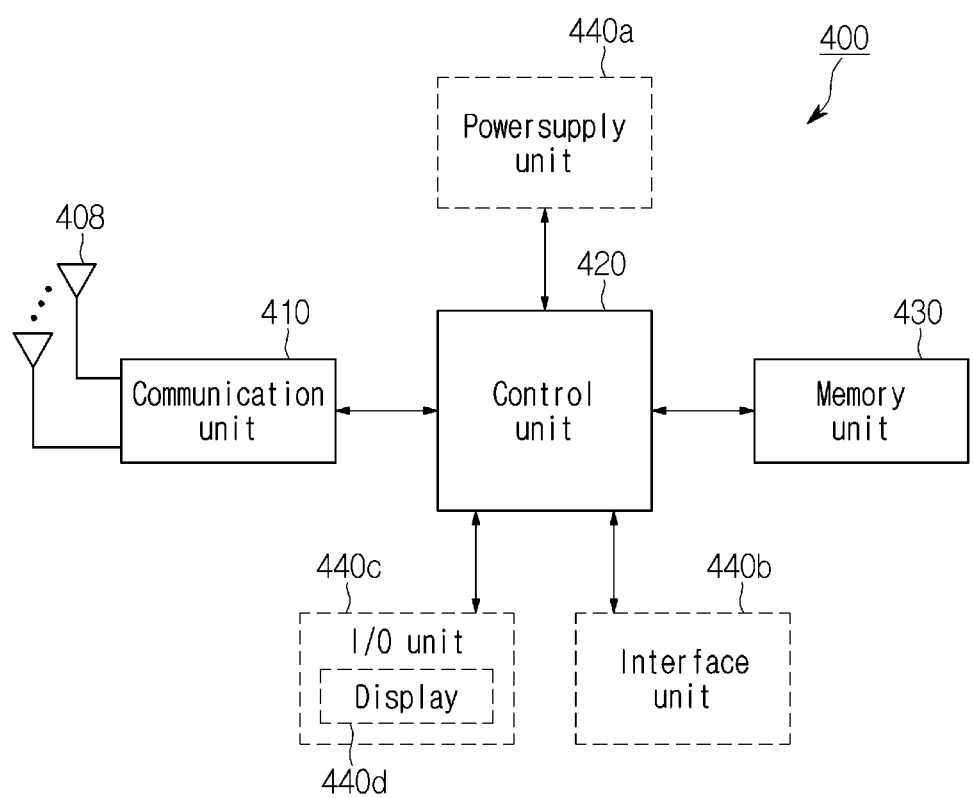
FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to abase station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
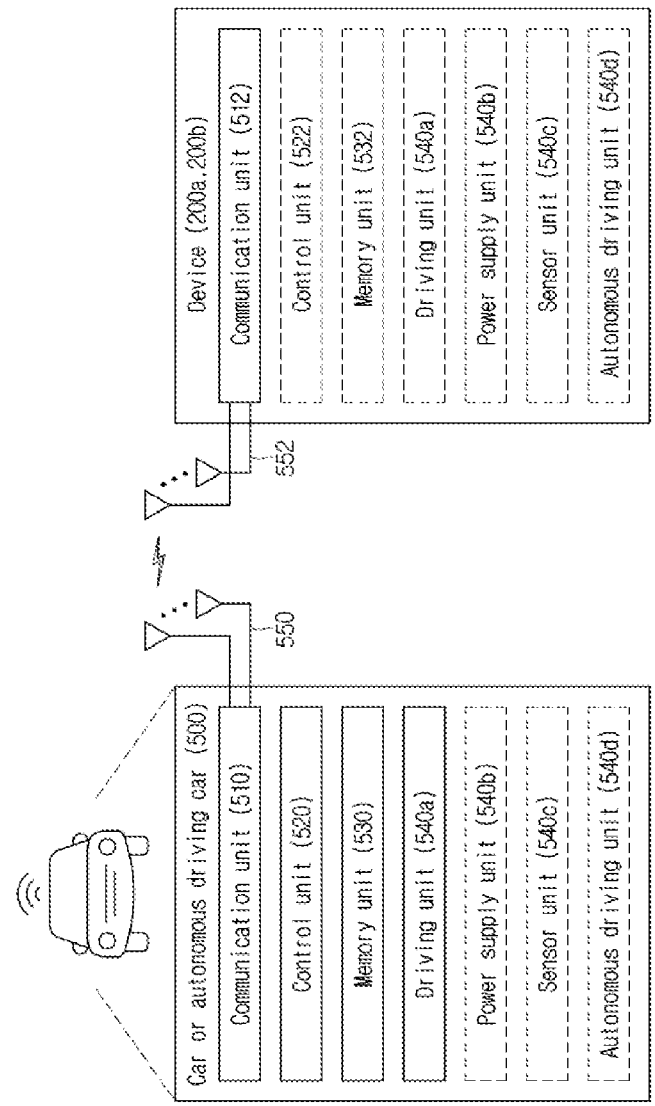
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540a may drive the car or autonomous driving car 500 on the ground. The driving unit 540a may include an engine, a motor, a power train, wheels, a brake, a steering device, etc. The power supply unit 540b may supply power to the car or autonomous driving car 500, and include a wired/wireless charging circuit, a battery, etc. The sensor unit 540c may obtain a vehicle state, surrounding environment information, user information, etc. The sensor unit 540c may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540d may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540d may generate an autonomous driving route and a driving plan based on the acquired data. The control unit 520 may control the driving unit 540a(e.g., speed/direction control) such that the car or autonomous driving car 500 moves along the autonomous driving route according to the driving plane. During autonomous driving, the communication unit 510 may a periodically/periodically acquire latest traffic information data from an external server and acquire surrounding traffic information data from neighboring cars. In addition, during autonomous driving, the sensor unit 540c may acquire a vehicle state and surrounding environment information. The autonomous driving unit 540d may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
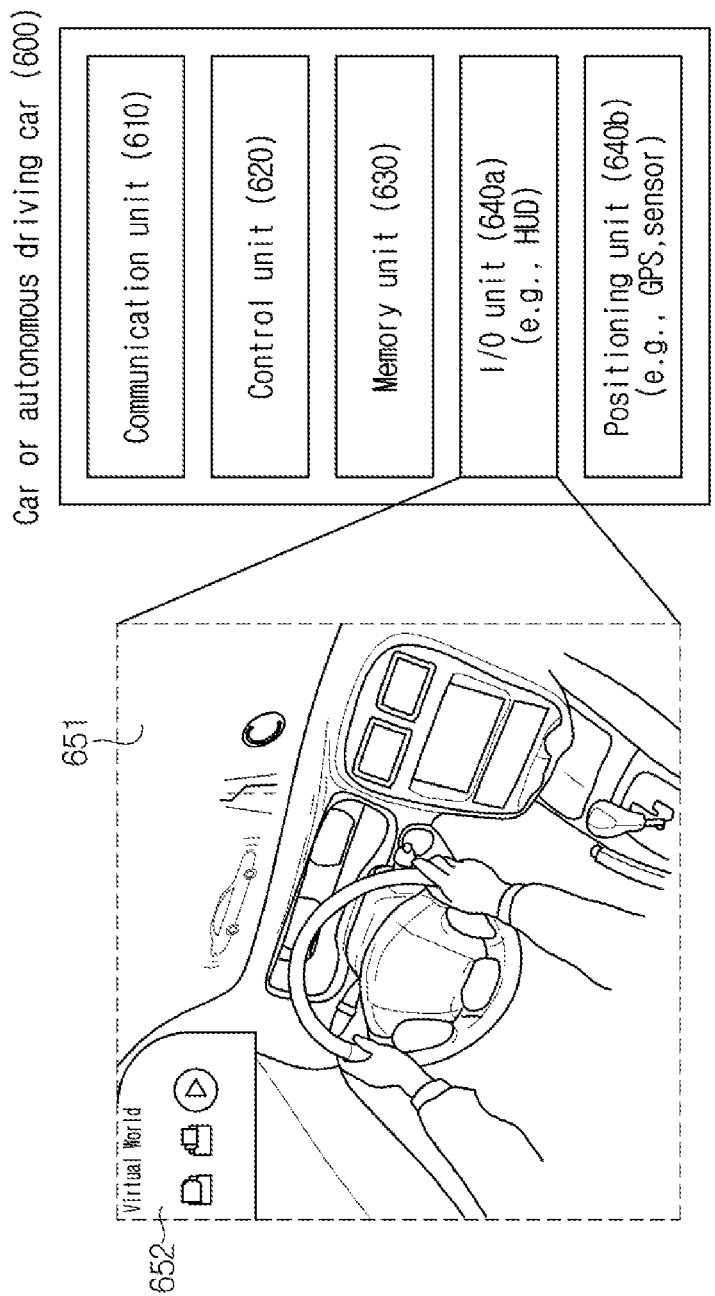
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640a and a positioning unit 640b. Here, the blocks 610 to 630/640a to 640b may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640a may output AR/R objects based on information in the memory unit 630. The input/output unit 640a may include a HUD. The positioning unit 640b may acquire the position information of the mobility 600. The position information may include absolute position information of the mobility 600, position information in a driving line, acceleration information, position information of neighboring vehicles, etc. The positioning unit 640b may include a global positioning system (GPS) and various sensors.

For example, the communication unit 610 of the mobility 600 may receive map information, traffic information, etc. from an external server and store the map information, the traffic information, etc. in the memory unit 630. The positioning unit 640b may acquire mobility position information through the GPS and the various sensors and store the mobility position information in the memory unit 630. The control unit 620 may generate a virtual object based on the map information, the traffic information, the mobility position information, etc., and the input/output unit 640a may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640a. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
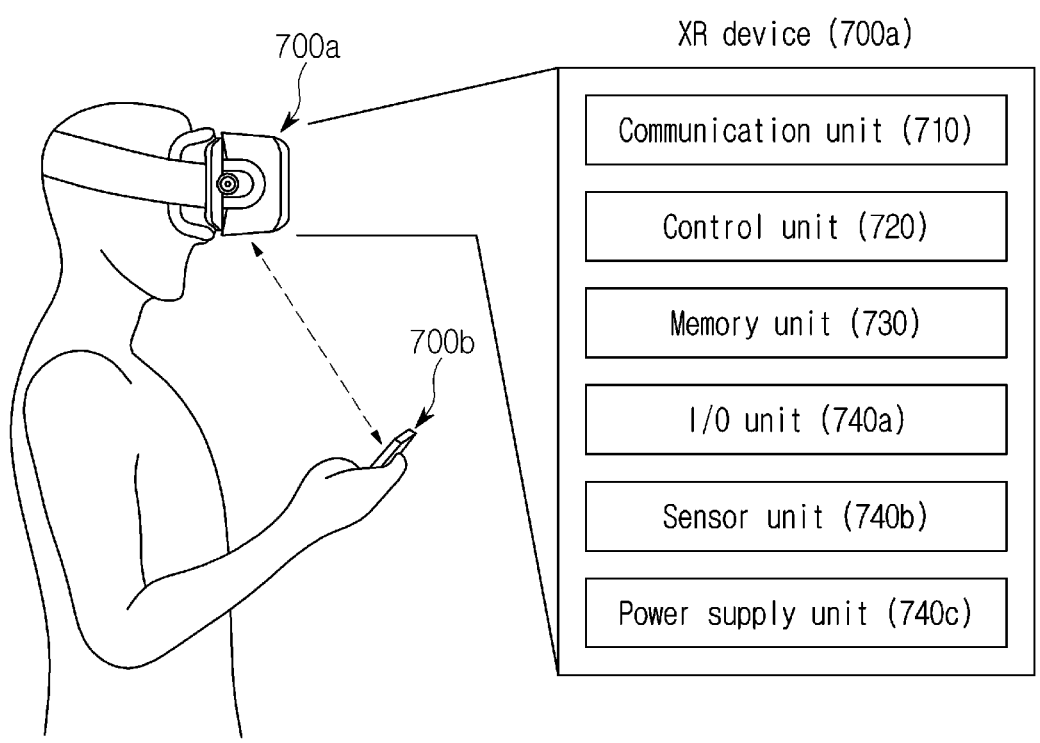
FIG. 7 is a view showing an example of an XR device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700a may include a communication unit (transceiver) 710, a control unit (controller) 720, a memory unit (memory)730, an input/output unit 740a, a sensor unit 740b and a power supply unit (power supply) 740c. Here, the blocks 710 to 730/740a to 740c may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700a to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700a or generate an XR object.

The input/output unit 740a may acquire control information, data, etc. from the outside and output the generated XR object. The input/output unit 740a may include a camera, a microphone, a user input unit, a display, a speaker and/or a haptic module. The sensor unit 740b may obtain an XR device state, surrounding environment information, user information, etc. The sensor unit 740b may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740c may supply power to the XR device 700a and include a wired/wireless charging circuit, a battery, etc.

For example, the memory unit 730 of the XR device 700a may include information (e.g., data, etc.) necessary to generate an XR object (e.g., AR/VR/MR object). The input/output unit 740a may acquire an instruction for manipulating the XR device 700a from a user, and the control unit 720 may drive the XR device 700a according to the driving instruction of the user. For example, when the user wants to watch a movie, news, etc. through the XR device 700a, the control unit 720 may transmit content request information to another device (e.g., a hand-held device 700b) or a media server through the communication unit 730. The communication unit 730 may download/stream content such as a movie or news from another device (e.g., the hand-held device 700b) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740a or the sensor unit 740b.

In addition, the XR device 700a may be wirelessly connected with the hand-held device 700b through the communication unit 710, and operation of the XR device 700a may be controlled by the hand-held device 700b. For example, the hand-held device 700b may operate as a controller for the XR device 700a. To this end, the XR device 700a may acquire three-dimensional position information of the hand-held device 700b and then generate and output an XR object corresponding to the hand-held device 700b.

Figure 8:
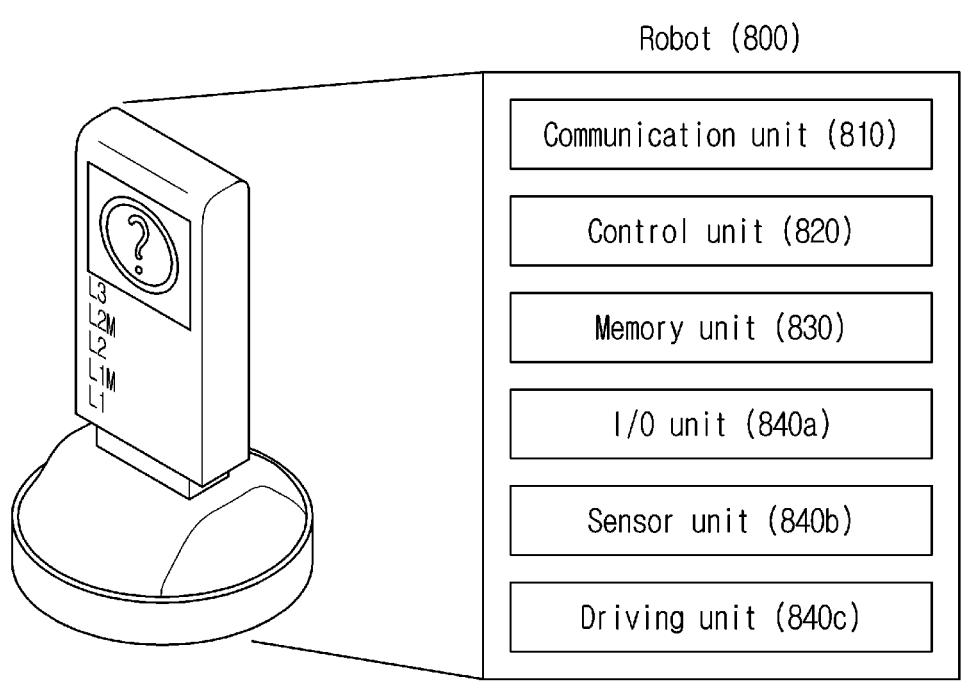
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840a, sensor unit 840b and a driving unit 840c. Here, blocks 810 to 830/840a to 840c may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840a may acquire information from the outside of the robot 800 and output information to the outside of the robot 800. The input/output unit 840a may include a camera, a microphone, a user input unit, a display, a speaker and/or a haptic module.

The sensor unit 840b may obtain internal information, surrounding environment information, user information, etc. of the robot 800. The sensor unit 840b may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840c may perform various physical operations such as movement of robot joints. In addition, the driving unit 840c may cause the robot 800 to run on the ground or fly in the air. The driving unit 840c may include an actuator, a motor, wheels, a brake, a propeller, etc.

Figure 9:
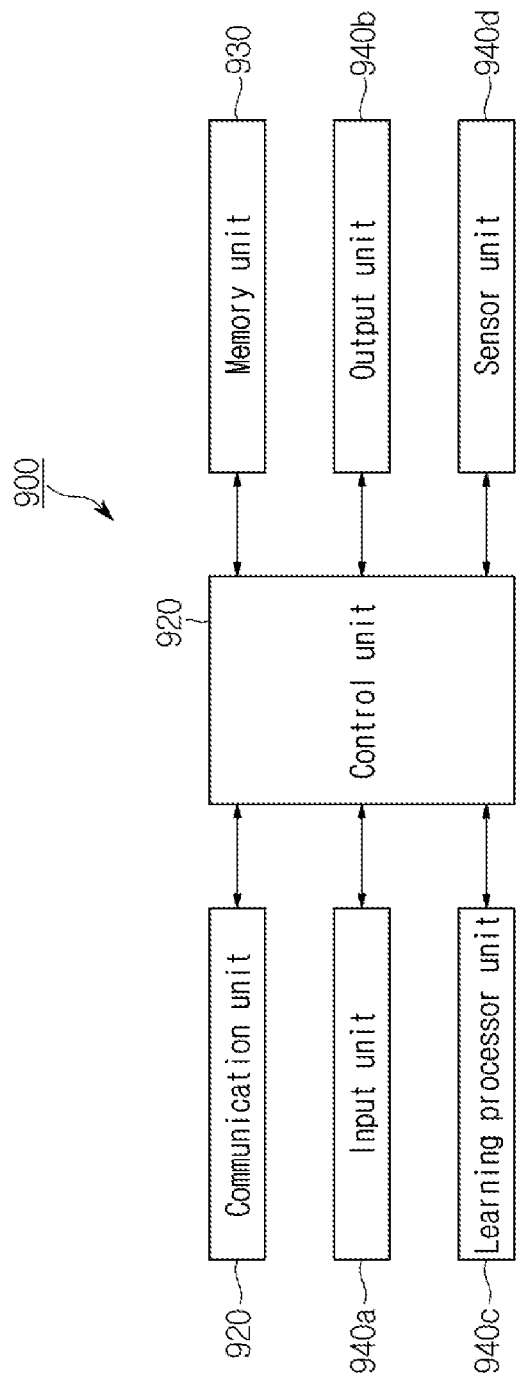
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver)910, a control unit (controller) 920, a memory unit (memory) 930, an input/output unit 940a/940b, a leaning processor unit (learning processor) 940c and a sensor unit 940d. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1,140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 940c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data, to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
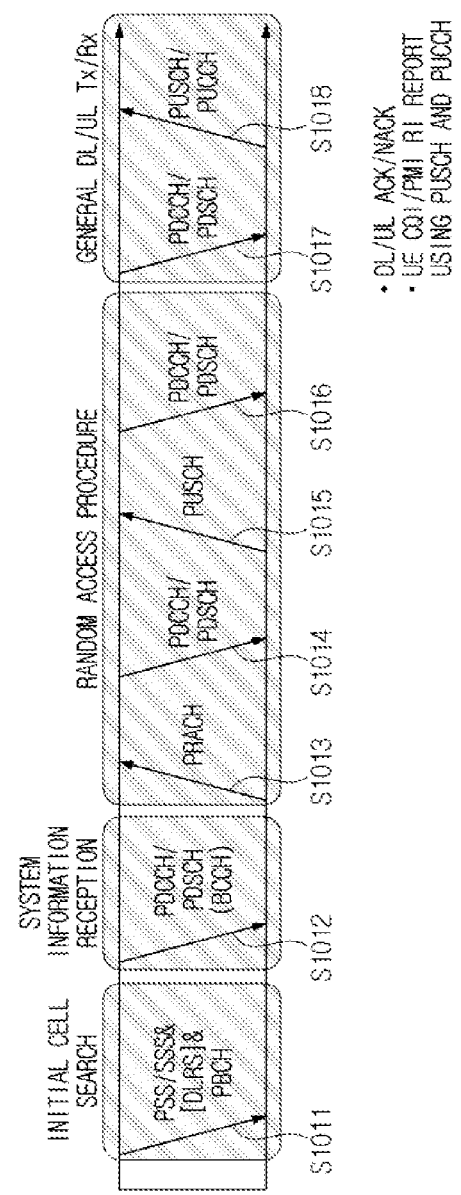
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may a periodically transmit UCI through a PUSCH according to a request/instruction of a network.

Figure 11:
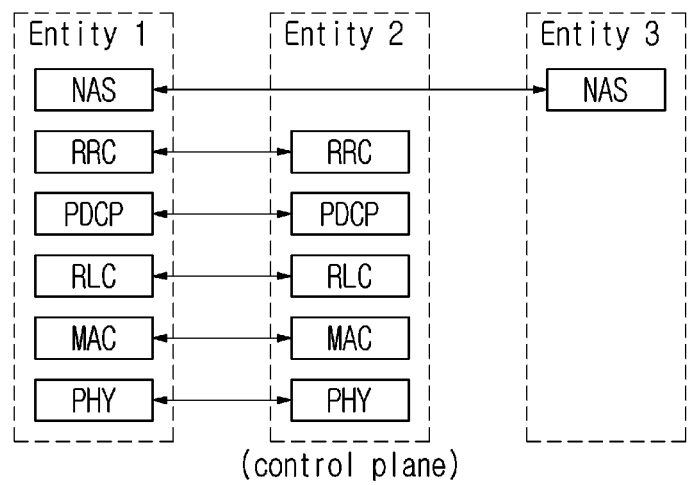
FIG. 11 is a view showing the structure of a control plane and a user plane of a radio interface protocol applicable to the present disclosure.
Figure 11:
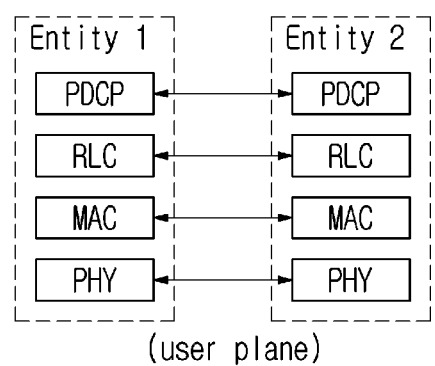

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
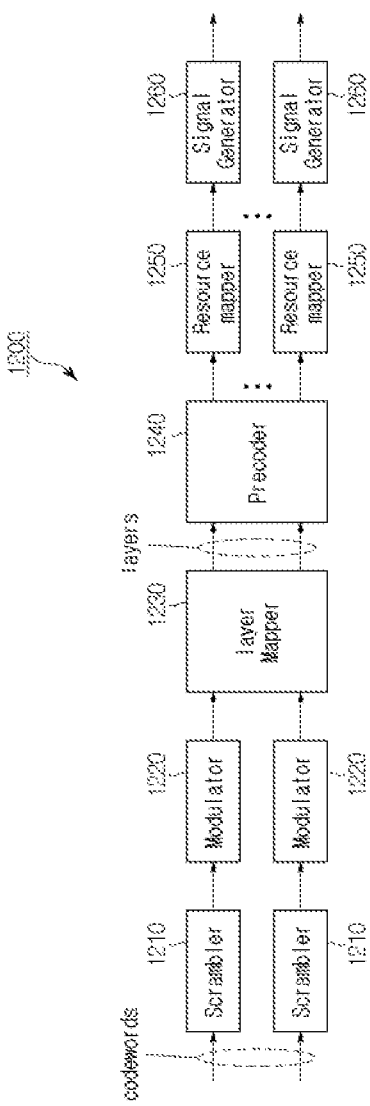
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transformprecoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
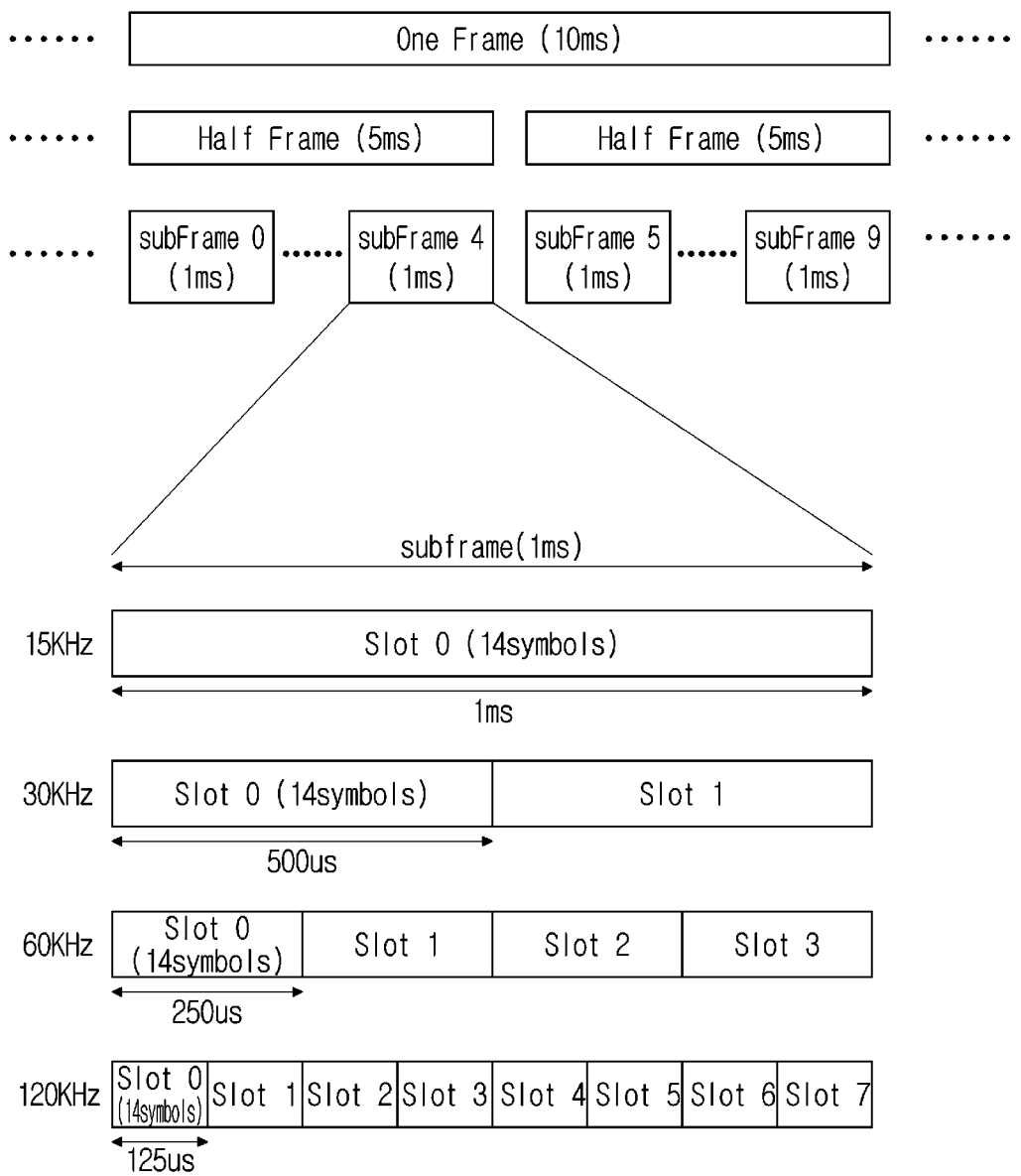
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N_{symb}^{slot}$ may indicate the number of symbols in a slot, $N_{slot}^{frame,\mu}$ may indicate the number of slots in a frame, and $N_{slot}^{subframe,\mu}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
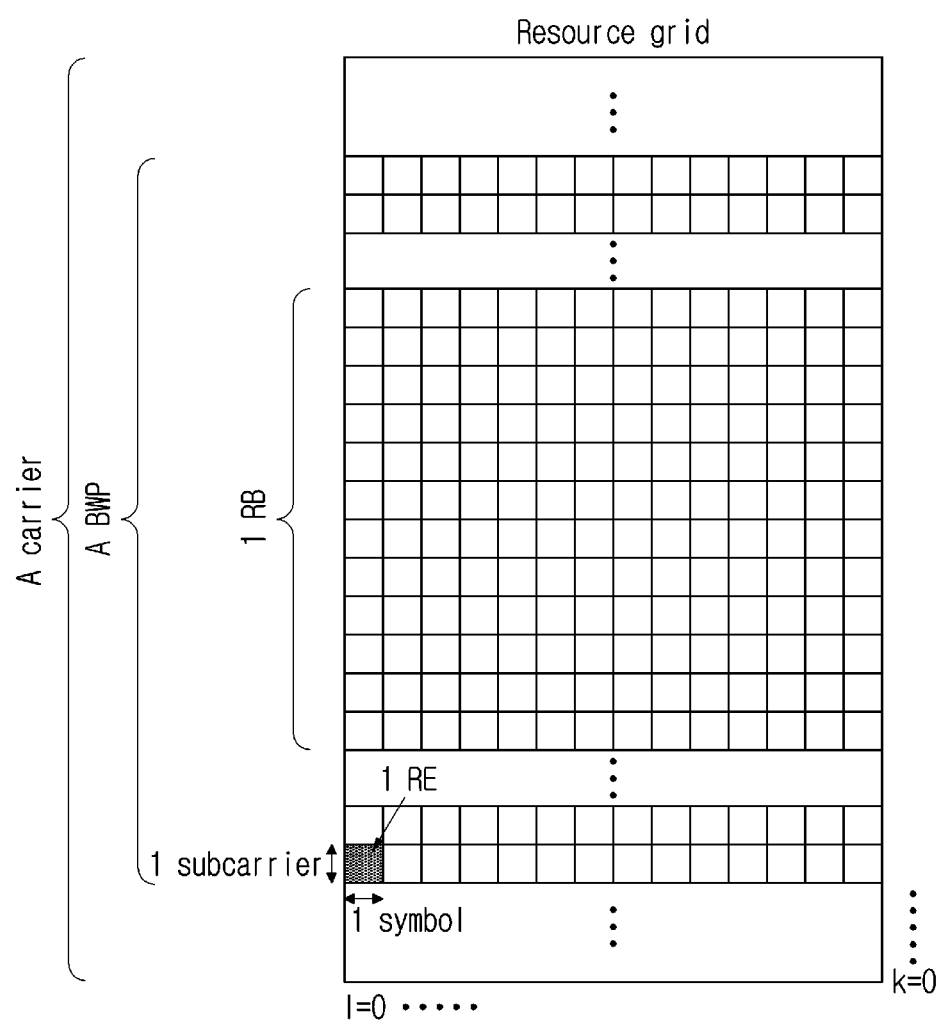
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality of (e.g., 12) consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
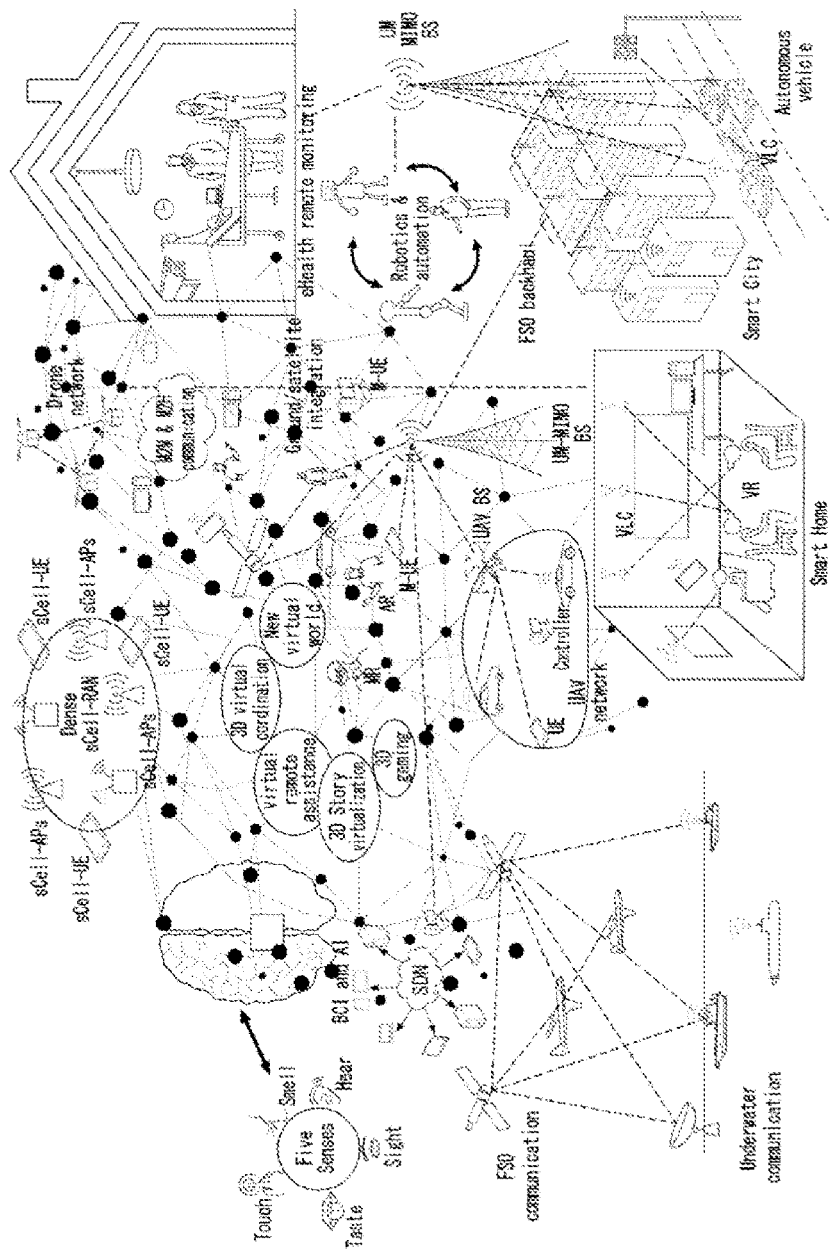
FIG. 15 is a view showing an example of a communication structure providable in a 6G system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System
Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 16:
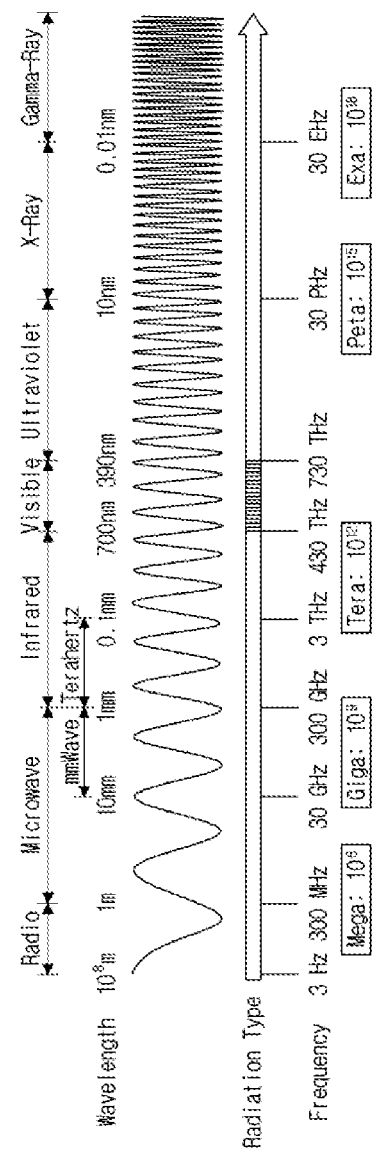
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
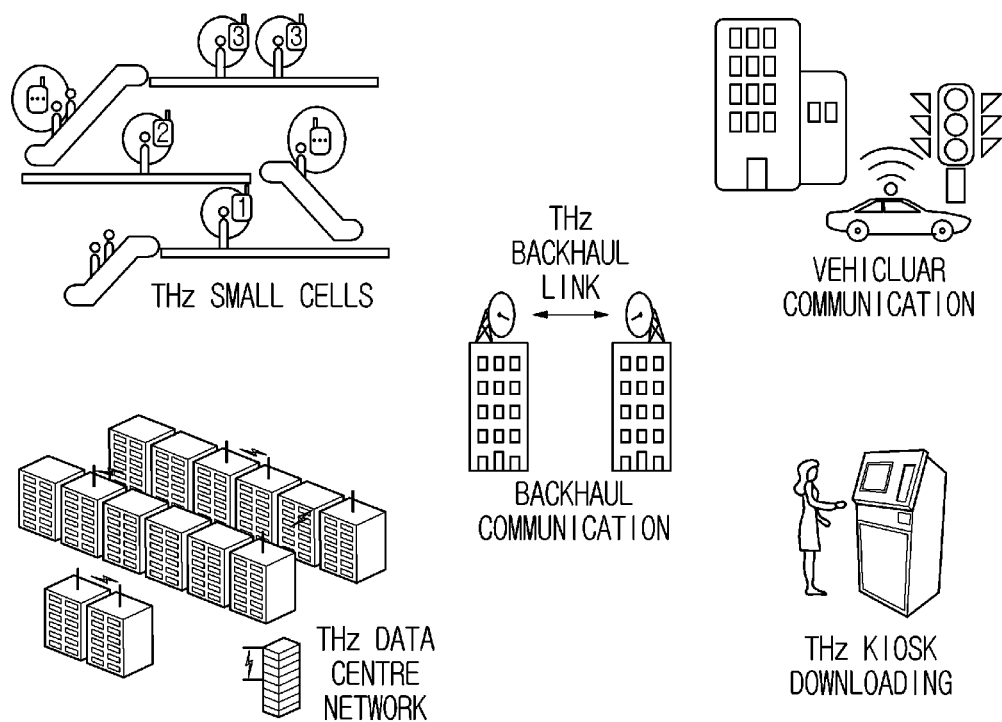
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading. Table 5 below shows an example of technology which may be used in the THz wave.

TABLE 5

| | |
|---|---|
| Tranceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
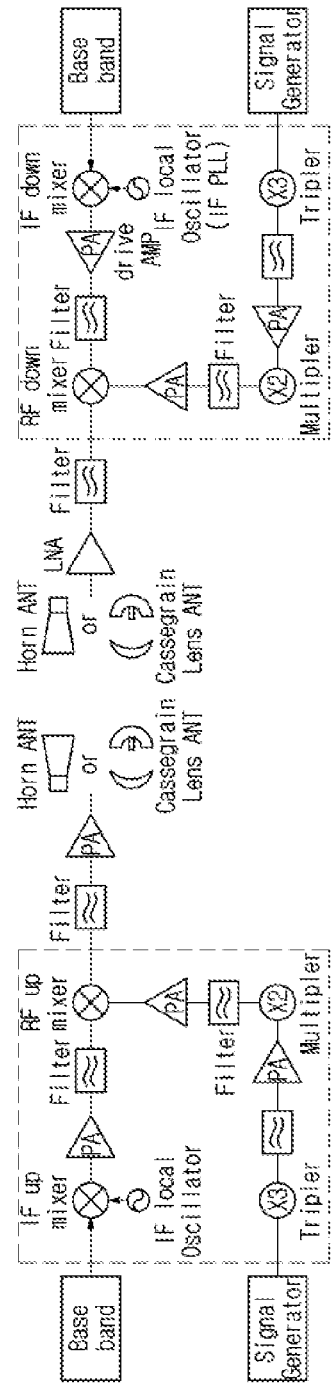
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
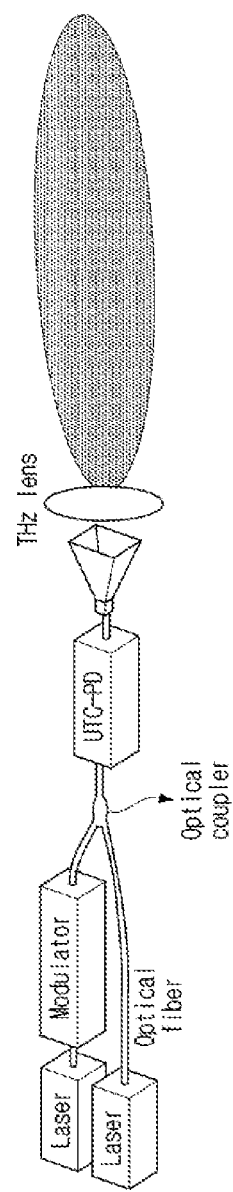
FIG. 19 is a view showing a THz signal generation method applicable to the present disclosure.
Figure 20:
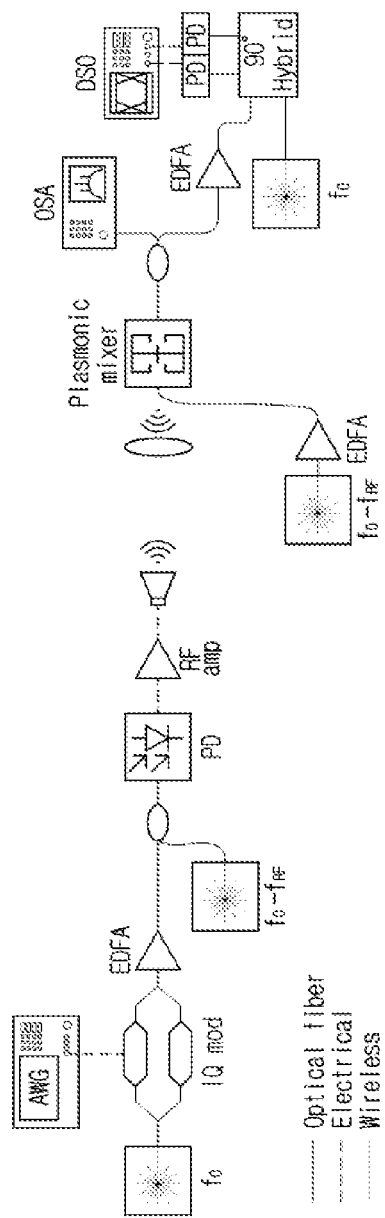
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
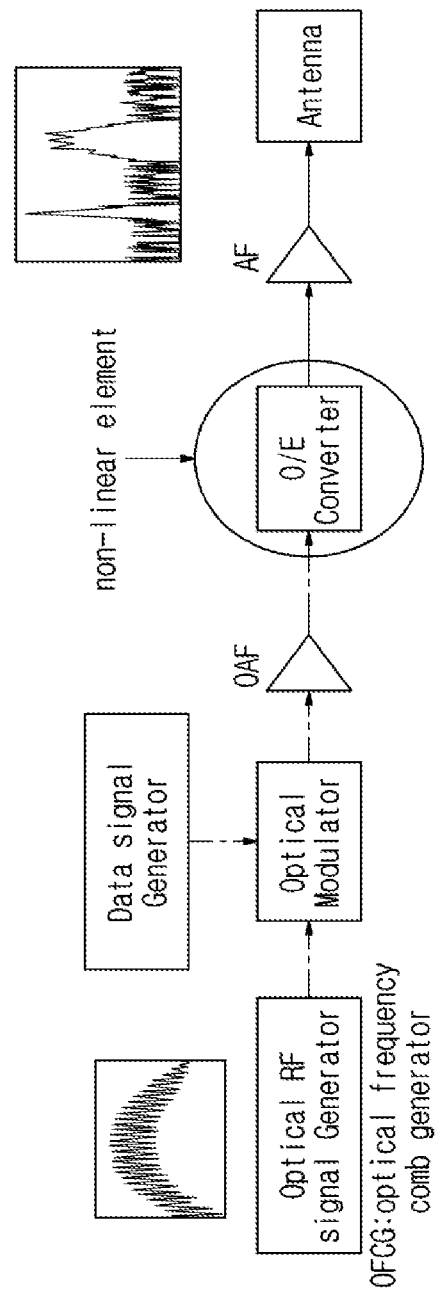
FIG. 21 is a view showing a transmitter structure applicable to the present disclosure.
Figure 22:
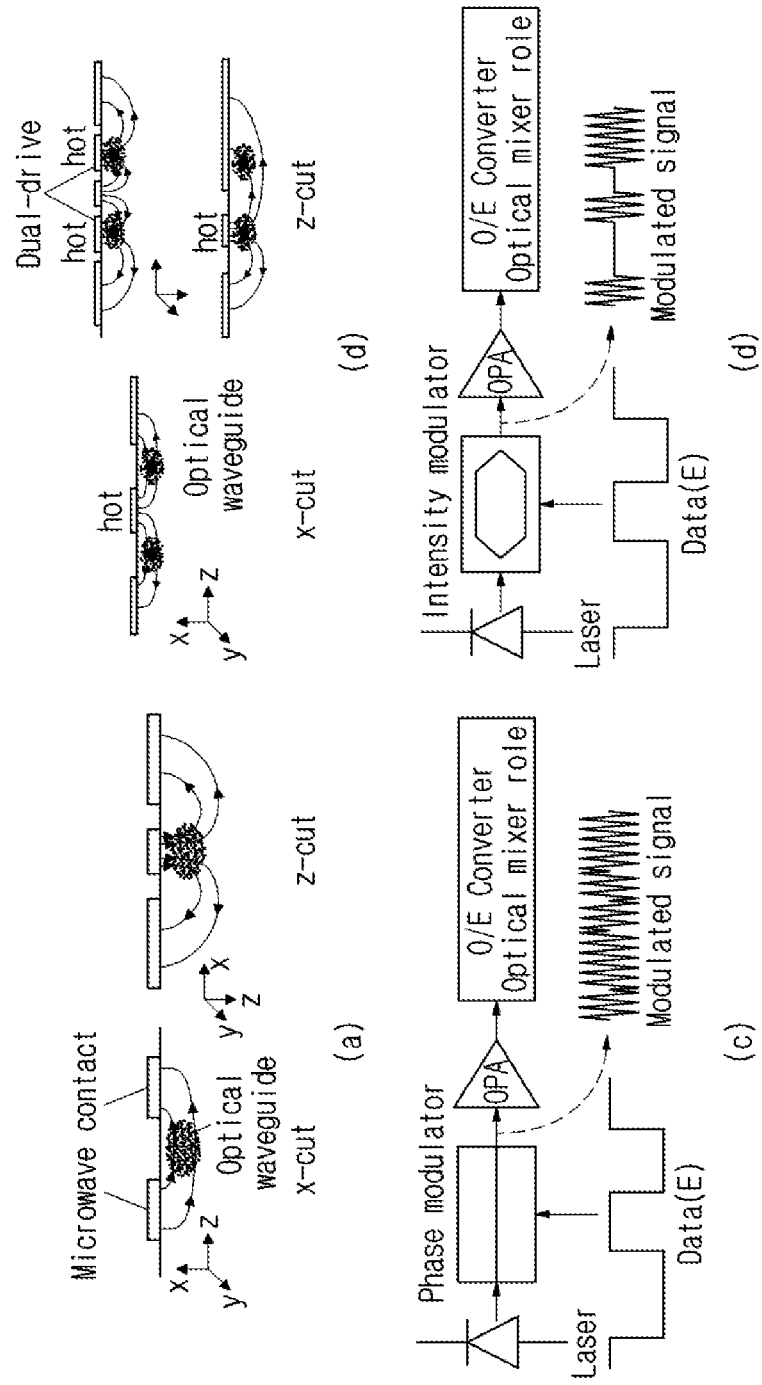
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^2$ dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Hereinafter, the detailed embodiments of the present disclosure will be described based on the above description.

As described above, the case where a UE performs communication based on a new communication system may be considered. At this time, only an electronic device may be used in a transmitter for an existing communication system (e.g., millimeter band communication). That is, when a transmitter modulates a baseband signal, converts the baseband signal into a passband signal, and generates a carrier signal, the transmitter may perform the above-described operation using the electronic device.

Here, as described above, in the new communication system, the terahertz band may be used. That is, as the new communication system is introduced, signal transmission may be performed based on wider bandwidth at a higher frequency band. At this time, when a carrier frequency increases and a transmission rate increases based on wide bandwidth, there is a limitation in the transmitter generating the signal using only the electronic device.

Specifically, when the transmitter uses a high frequency band, the transmitter may have limitations in increasing the operating frequency due to the characteristic limitations of materials configuring the electronic device. In addition, it may not be easy to manufacture a broadband operating device for generating an ultrahigh-speed signal (e.g., >100 Gb/s). In addition, in a frequency multiplication-based carrier signal generation method, it may be difficult to satisfy the requirements of wireless communication since phase noise increases by 6 dB whenever the frequency is doubled.

In consideration of the above-described problem, a method of configuring a transmitter for sub-THz band communication by utilizing optical technology will be described. At this time, the optical device may include at least one or more of a laser, an optical coupler, an optical modulator, an optical filter, a photodetector, and an optical amplifier. In addition, a method of generating a sub-THz band radio signal by utilizing optical technology may use the principle in which, when optical signals having different wavelengths are combined in a photodetector, a sub-THz band signal having a frequency corresponding to a difference between two wavelengths is generated.

For example, as a method of generating two optical signals having different wavelengths, optical signals from two single wavelength lasers operating at different wavelengths may be combined to generate a signal. At this time, the apparatus for generating the sub-THz band signal can easily change the signal frequency of the Sub-THz band by independently adjusting the frequencies of the two lasers. However, the above-described method may directly affect the signal phase of the sub-THz band where the phase noise of the two lasers is generated. Therefore, the signal generated based on the above-described method may have a difficulty in using a laser having a very narrow line width (e.g. a line width of tens of Hz or less). For example, the above-described problem may be solved based on a method of increasing the correlation between the phase noises of the two lasers, but a complex synchronization technique may be required even in the case described above.

As another example, a method of using an optical comb signal as a method of generating two optical signals having different wavelengths may be considered. Here, the optical comb signal may be generated by a plurality of sine waves at regular frequency intervals. At this time, only two desired frequency components of the plurality of generated sine wave can be filtered by using only an optical filter. Thereafter, the filtered sine waves may be combined to generate a sub-THz band signal. In addition, all phase noises of the optical comb may have high correlation. Therefore, even if the two frequency components generated as described above are applied to the photodetector, the phase noise of the laser may hardly affect the phase of the sub-THz band radio signal.

For example, a mode-locked laser is an optical device which generates a ultrahigh-speed pulse train, and the ultrahigh-speed pulse train in the time domain may correspond to an optical comb in the frequency domain. At this time, optical combs may have a strong correlation with each other in order to construct an ultrahigh-speed pulse train. Here, the mode-locked laser periodically generates a pulse having a very short width in the time domain, but a pulse generation interval may deviate from an ideal period. This may be a timing jitter of an ultrahigh-speed pulse train. That is, the timing jitter of the ultrahigh-speed pulse train may occur because the length of the path experienced by each ultrahigh-speed pulse deviates from a predetermined value due to at least one of laser noise, ambient temperature change, and ambient vibration. For example, the timing jitter of the mode-locked laser and the line width due to the phase noise of the generated sub-THz band signal may be as shown in Equation 1 below.

$$\Delta\omega_n = (2\pi n \tau_0 f_{rep})^2 \Delta\omega_\tau \qquad \text{Equation 1}$$

where, Equation 1 may be composed of the line width $\Delta\omega_n$ and order n (an integer greater than or equal to 1) of the sub-THz band signal, the time domain pulse width (full width half-maximum) $\tau_0$ of the ultrahigh-speed pulse, the repetition rate $f_{rep}$ of the mode-locked laser and the diffusion coefficient $\Delta\omega_\tau$ of the timing jitter. At this time, the frequency of the generated sub-THz band signal may be $nf_{rep}$. For example, Equation 1 above is applicable even when the two optical combs of the mode-locked laser output are optically filtered and then combined again. In addition, the diffusion coefficient of the timing jitter is a variable related to the timing jitter and may be expressed based on Equation 2 below.

$$\sigma_{\Delta\tau}^2(T) = \left\langle \left[\frac{\Delta\tau(T)}{\tau_0}\right]^2 \right\rangle = 2\Delta\omega_\tau T \qquad \text{Equation 2}$$

At this time, Equation 2 may be composed of a difference $\Delta\tau$ in timing jitter between adjacent ultrahigh-speed pulses, the time domain pulse width $\tau_0$ of the ultrahigh-speed pulse, the variance $\sigma_{\Delta\tau}^2(T)$ of $\Delta\tau$, the diffusion coefficient $\Delta\omega_\tau$ of the timing jitter and an observation time T.

For example, Equation 1 may mean that the line width of the sub-THz band signal is proportional to the square of the time-domain pulse width of the ultrahigh-speed pulse and is proportional to the diffusion coefficient of the timing jitter. Also, as an example, Equation 2 may mean that the diffusion coefficient of the timing jitter is proportional to the difference in timing jitter between ultrahigh-speed pulses. Accordingly, the phase noise can be lowered by reducing the time-domain pulse width of the ultrahigh-speed pulse and stabilizing the path length to lower the timing jitter to a certain level or less. In addition, the period and repetition rate of the ultrahigh-speed pulse train may have reciprocal relationship therebetween. In this case, in order to easily filter a single optical comb among mode-locked laser outputs using an optical filter, it may be desirable that the repetition rate is approximately 10 GHz or more. In particular, since the repetition rate is inversely proportional to the laser cavity length, a low repetition rate can be a chief obstacle to reducing the laser cavity length. Therefore, it may be desirable that the period of the ultrahigh-speed pulse train is ~100 ps or less.

For example, when using a mode-locked laser which satisfies the timing jitter and the periodic conditions as described above, the apparatus can generate a sub-THz band signal having excellent phase noise characteristics. Hereinafter, a method and apparatus for generating an optical device-based sub-THz band ultrahigh-speed signal capable of satisfying the corresponding conditions based on the above description will be described.

Figure 23:
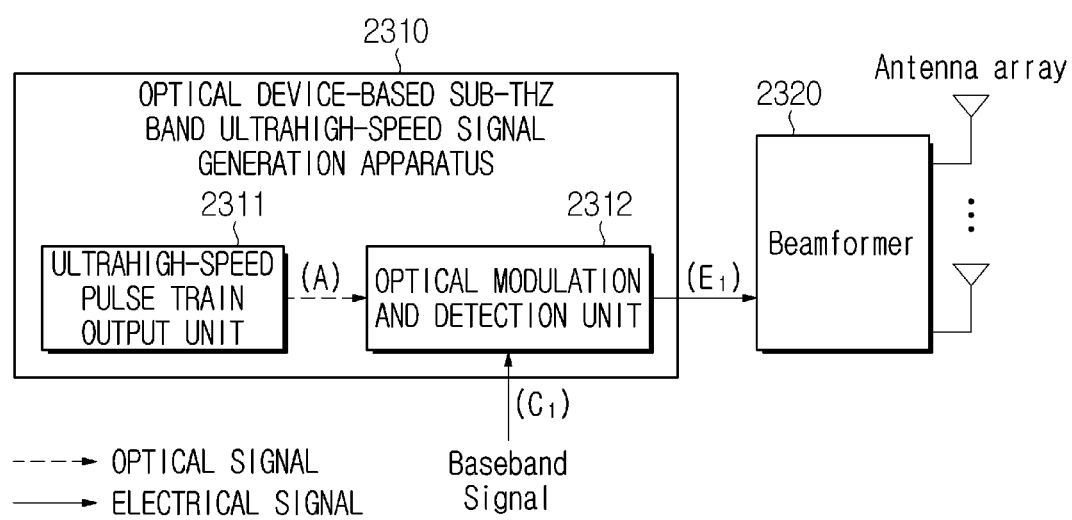
FIG. 23 is a view showing an apparatus for generating an optical device-based sub-THz band ultrahigh-speed signal applicable to the present disclosure.

As a specific example, FIG. 23 is a view showing an apparatus for generating an optical device-based sub-THz band ultrahigh-speed signal applicable to the present disclosure.

For example, the apparatus of FIG. 23 is applicable to a UE and a base station. In addition, for example, the apparatus of FIG. 23 is applicable to the devices of FIGS. 4 to 9, and is not limited to a specific apparatus. That is, in an apparatus for transmitting a signal, the apparatus of FIG. 23 may be implemented as the configuration of the apparatus for transmitting a signal, and is not limited to the above-described embodiments.

At this time, referring to FIG. 23, an optical signal having excellent timing jitter performance may be generated through an ultrahigh-speed pulse train output unit 2311. At this time, the generated optical signal may be converted into an electrical signal in an optical modulation and detection unit 2312. For example, a baseband signal which is an electrical signal may be applied to the optical modulation and detection unit 2312 through optical modulation. The output electrical signal of the optical modulation and detection unit 2312 may be a sub-THz band electrical signal for the purpose of being combined with the baseband signal. That is, the sub-THz band electrical signal may include information on the baseband signal. At this time, the output of the optical device-based ultrahigh-speed signal generation apparatus may be radiated to an antenna array through a beamformer. Thereafter, the output signal may be transmitted to a receiver.

Figure 24:
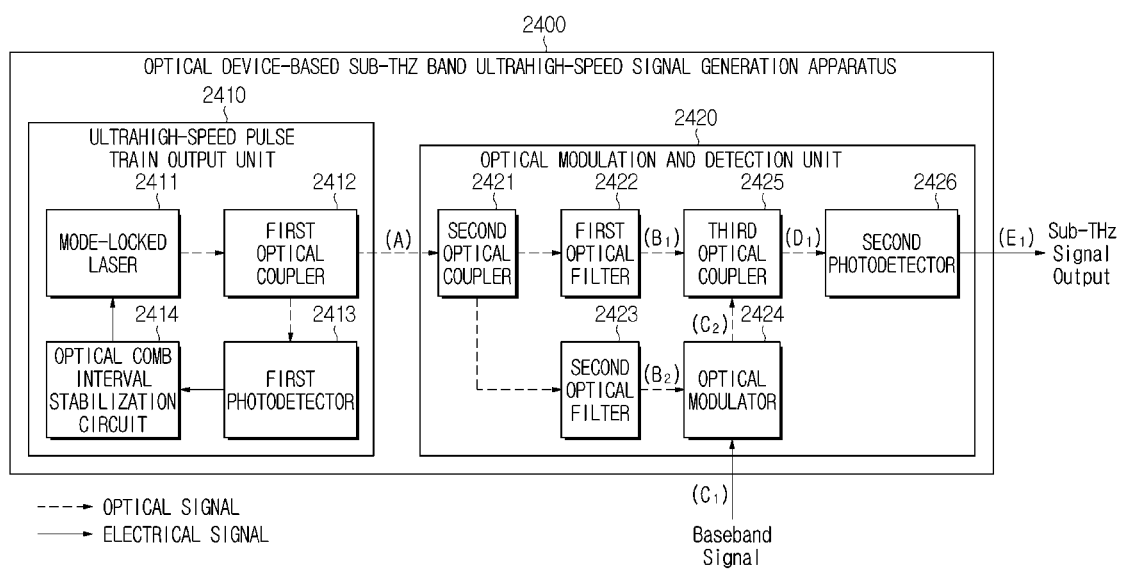
FIG. 24 is a view schematically showing an apparatus for generating an optical device-based sub-THz band ultrahigh-speed signal applicable to the present disclosure.

At this time, as a specific example, FIG. 24 is a view schematically showing an apparatus for generating an optical device-based sub-THz band ultrahigh-speed signal applicable to the present disclosure. Referring to FIG. 24, the apparatus 2400 for generating optical device-based sub-THz band ultrahigh-speed signal may include an ultrahigh-speed pulse train output unit 2410 and an optical modulation and detection unit 2420. At this time, the ultrahigh-speed pulse train output unit 2410 may include one or more of a mode-locked laser 2411, a first optical coupler 2412, a first photodetector 2413 and an optical comb interval stabilization circuit 2414. In addition, the optical modulation and detection unit 2420 may include one or more of a second optical coupler 2421, a first optical filter 2422, a second optical filter 2423, an optical modulator 2424, a third coupler 2425 and a second photodetector 2426.

Here, the ultrahigh-speed pulse train output unit 2410 may generate an ultrahigh-speed pulse train with excellent periodicity based on design of the detailed devices 2411, 2412, 2413 and 2414. For example, the mode-locked laser 2411 may output the ultrahigh-speed pulse train repeated every $1/f_{rep}$ time. At this time, the output of the mode-locked laser may be split through the first optical coupler 2412. In addition, the output of the first optical coupler 2412 may be converted into an electrical signal using the first photodetector 2413. Thereafter, the output of the first photodetector 2413 may be converted into a feedback signal using the optical comb interval stabilization circuit 2414. At this time, the output of the optical comb interval stabilization circuit 2414 may be input to the mode-locked laser 2411 again to adjust the internal cavity length of the mode-locked laser.

Figure 25:
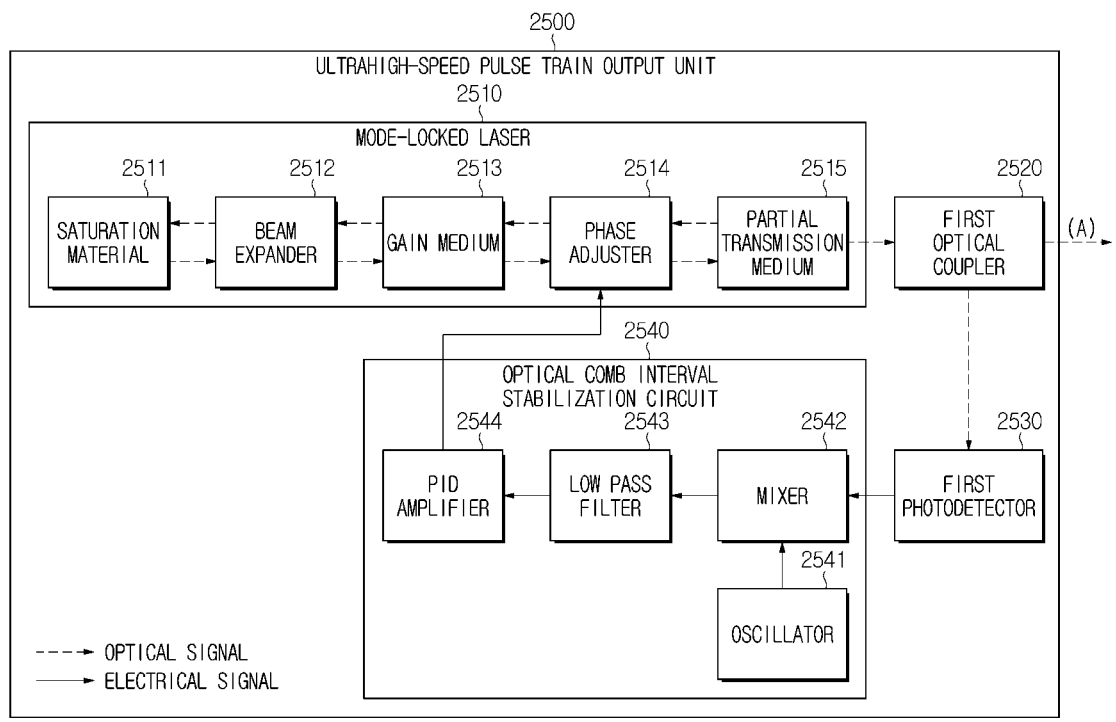
FIG. 25 is a view showing a detailed structure of an ultrahigh-speed pulse train output unit applicable to the present disclosure.
Figure 26:
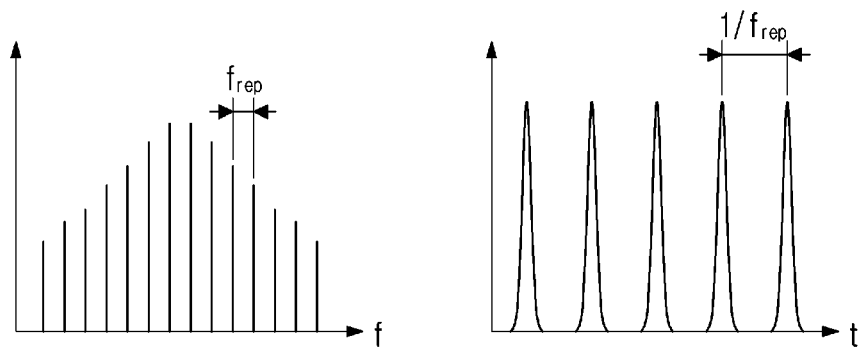
FIG. 26 is a diagram showing ultrahigh-speed pulse train output applicable to the present disclosure.

At this time, as a specific example, FIG. 25 is a view showing a detailed structure of an ultrahigh-speed pulse train output unit applicable to the present disclosure. FIG. 26 is a diagram showing ultrahigh-speed pulse train output applicable to the present disclosure.

For example, referring to FIG. 26(a), ultrahigh-speed pulse train output may have a form of a frequency comb signal having an interval of $f_{rep}$ on a frequency axis. In addition, referring to FIG. 26(b), ultrahigh-speed pulse train output may have a pulsed signal having a period of $1/f_{rep}$ on a time axis. At this time, accuracy of $f_{rep}$ may be controlled by the optical comb interval stabilization circuit.

More specifically, referring to FIG. 25, an ultrahigh-speed pulse train output unit 2500 may include a mode-locked laser 2510, a first optical coupler 2520, a first photodetector 2530 and an optical comb interval stabilization circuit 2540, as described above. Here, the mode-locked laser 2510 may operate based on at least one of a saturation material material 2511, a beam expander 2512, a gain medium 2513, a phase adjuster 2514 or a partial transmission medium 2515, which will be described below. Next, the first optical coupler 2520 may branch the optical ultrahigh-speed pulse signal which has passed through the partial transmission medium of the mode-locked laser 2510. At this time, a part of the branched signal may be applied to the second optical coupler of the optical modulation and detection unit. Here, the characteristics of the signal applied to the second optical coupler of the optical modulation and detection unit may be ultrahigh-speed pulse train output. In addition, a part of the branched signal may be applied to the first photodetector 2530. Thereafter, the first photodetector 2530 may detect and convert the branched optical ultrahigh-speed pulse signal received from the first optical coupler 2520 into an electrical signal. At this time, the bandwidth of the first photodetector 2530 may be greater than the repetition rate $f_{rep}$ of the mode-locked laser. Thereafter, the optical comb interval stabilization circuit 2540 may process the electrical signal converted by the first photodetector 2530. For example, the optical comb interval stabilization circuit 2540 may include at least one of an oscillator 2541, a mixer 2542, a low pass filter 2543 or a proportional-integral-differential (PID) amplifier. At this time, for example, both an electrical oscillator and an optical oscillator may be used as the oscillator 2541. The output frequency of the oscillator 2541 may be a value obtained by dividing a sub-THz band frequency to be generated by an integer. For example, the frequency of the oscillator 2541 may be $f_{rep}$. In addition, the mixer 2542 may mix the electrical signal output from the first photodetector 2530 and the electrical signal output from the oscillator 2541 and extract the repetition rate of the mode-locked laser and the phase difference of the oscillator. At this time, the low pass filter 2543 may filter the output of the mixer. Here, the bandwidth of the low pass filter 2543 may be very lower than the repetition rate of the mode-locked laser. At this time, the signal output through the low pass filter 2543 may be proportional to the error of a target cavity length and an actual length. Thereafter, the PID amplifier 2544 may amplify the output signal of the low pass filter 2543 to apply the signal to the phase adjuster of the mode-locked laser 2514. For example, the output of the low pass filter is proportional to the error of the desired cavity length and the actual length and thus may be fed back to the phase adjuster through the PID amplifier. For example, the purpose of the feedback circuit is to maintain the actual cavity length varying by an outside temperature or vibration as close as possible to a set cavity length. For example, a PID controller may be used in the feedback circuit for reducing the error, and the present disclosure is not limited to the above-described embodiment.

That is, the output of the optical comb interval stabilization circuit 2540 may be fed back to the phase adjuster 2514 of the mode-locked laser 2510. At this time, for example, the mode-locked laser 2510 may include at least one of a satuation material 2511, a beam expander 2512, a gain medium 2513, a phase adjuster 2514 or a partial transmission medium 2515, as described above. At this time, the phase adjuster 2514 may set the total cavity length L of the mode-locked laser based on the electrical signal received from the optical comb interval stabilization circuit 2540. Here, the frequency interval $f_{rep}$ between optical combs and the total cavity length L may be expressed as shown in Equation 3 below.

$$f_{rep}=c/(2nL) \quad \text{Equation 3}$$

At this time, c denotes the speed of light and n is an effective refractive index of a laser cavity, which is a value greater than 1 and may be determined according to the physical properties. That is, setting of $f_{rep}$ for generating the frequency of the target sub-THz signal through the optical device-based sub-THz band ultrahigh-speed signal generation apparatus may be determined through control of the total length of the cavity of the mode-locked laser. Here, in order to facilitate optical filtering of the optical modulation and detection unit and easily implement a small mode-locked laser, $f_{rep}>\sim 10$ GHz may be set, but the present disclosure is not limited to the above-described embodiment.

Figure 27:
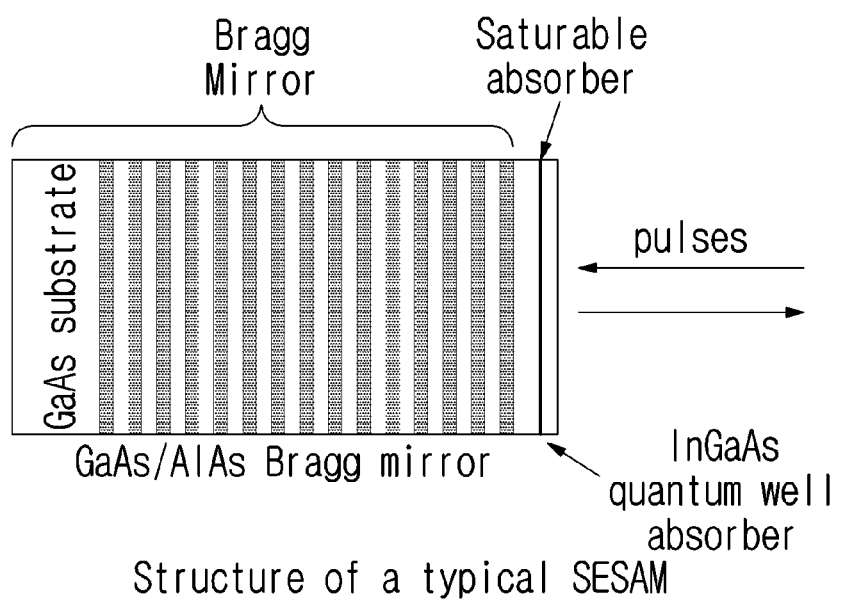
FIG. 27 is a view showing a SESAM structure applicable to the present disclosure.
Figure 28:
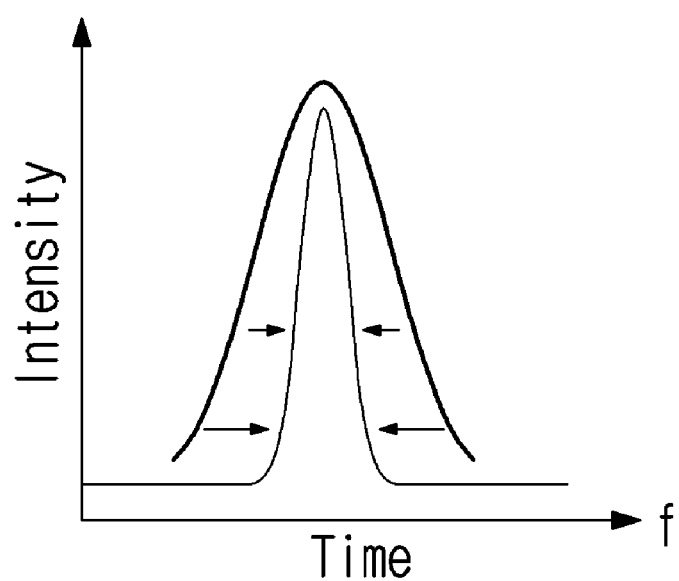
FIG. 28 is a view showing a pulse width applicable to the present disclosure.

At this time, in the mode-locked laser 2510, a semiconductor saturable absorber mirror (SESAM) may be used as the saturation material 2511. Therefore, the mode-locked laser 2510 may enable an ultrahigh-speed pulse to be generated and reduce the pulse width of the optical pulse. At this time, the SESAM may include a device for performing the functions of an optical filter and a mirror. At this time, for example, FIG. 27 is a view showing a SESAM structure applicable to the present disclosure. At this time, referring to FIG. 27, a spacing between Bragg mirrors may be 1/4 of the wavelength of an incident optical signal. That is, Bragg mirrors have a spacing of λ/4, and a saturable absorber may be a medium for reducing absorption as the intensity of an applied optical signal source increases. Therefore, based on the principle in which a part having a large intensity in the pulse of the applied optical signal source is relatively less absorbed and a part having a small intensity of the pulse is more absorbed, the width of the pulse may be reduced. For example, by repetitive reflection of the signal in the cavity, the width of the pulse may be reduced in terms of the single pulse shown in FIG. 28. For example, FIG. 28 is a view showing a pulse width applicable to the present disclosure.

In addition, for example, the beam expander 2512 of the mode-locked laser 2510 may be located between the saturation material 2511 and the gain medium 2513 to reduce optical power density incident on the saturation material 2511. At this time, the beam expander 2512 may reduce optical power density per single area by increasing the area of the beam in the cavity, upon movement from the gain medium 2513 to the saturation material 2511. This may be to accommodate a difference in optical power density per single area between the saturation material and the optical amplifier. On the contrary, the beam expander 2512 may facilitate signal amplification while passing through the gain medium 2513 having a small area for high optical gain, by reducing the area of the beam in the cavity, upon movement from the saturation material 2511 to the gain medium 2513.

In addition, the gain medium 2513 may amplify the ultrahigh-speed pulse passing through the gain medium 2513 using a semiconductor optical amplifier. At this time, amplification of an optical signal by simulated emission occurs in the gain medium 2513, and, to this end, sufficient electrical pump current capable of inducing population inversion needs to be provided. In addition, as described above, the phase adjuster 2514 may adjust the total cavity length by applying the output of the optical comb interval stabilization circuit 2540. This may be to minimize change in $f_{rep}$ by factors such as external temperature change or vibration. At this time, the phase adjuster 2514 may use a method of changing a refractive index by applying an electric field using the "Pockel's effect" or a method of changing a refractive index of a medium by injecting current as a method of changing a refractive index by changing the temperature of the medium. For example, in the phase adjuster 2514, the method of applying the electric field or the method of injecting may be preferred in order to minimize power consumption of the device. Next, in the partial transmission medium 2515, a partial transmission medium may be disposed at one end of the cavity, such that some ultrahigh-speed pulses transmit and some ultrahigh-speed pulses continue to reciprocate inside the cavity.

Based on the above description, the output of the mode-locked laser 2510 may be branched to the first optical coupler 2520 to be derived as the output of the ultrahigh-speed pulse train output unit 2500. At this time, the output of the ultrahigh-speed pulse train output unit 2500 may be input to the optical modulation and detection unit.

Figure 29:
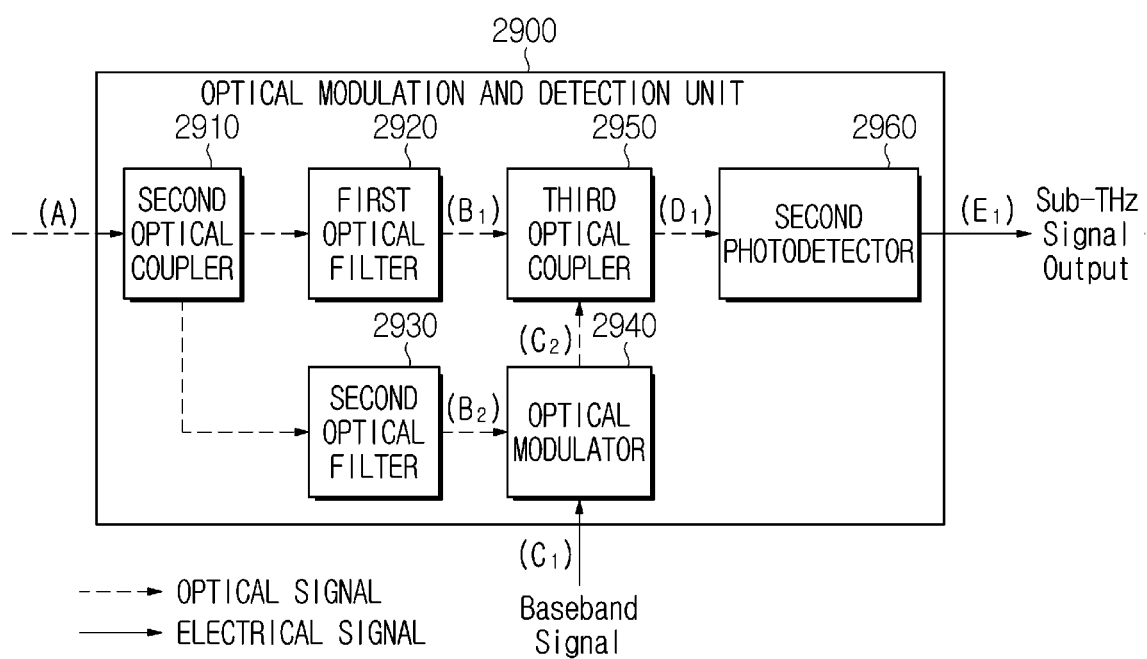
FIG. 29 is a view showing an optical modulation and detection unit applicable to the present disclosure.

For example, FIG. 29 is a view showing an optical modulation and detection unit applicable to the present disclosure. Referring to FIG. 29, the optical modulation and detection unit 2900 may include at least one of a second optical coupler 2910, a first optical filter 2920, a second optical filter 2930, an optical modulator 2940, a third optical coupler 2950 or a second photodetector 2960. At this time, the optical modulation and detection unit 2900 may receive an optical signal from the ultrahigh-speed pulse train output unit, receive a baseband signal $C_1$, and generate a sub-THz electrical signal $E_1$ based on the designe of each detailed device.

More specifically, the second optical coupler 2910 of the optical modulation and detection unit 2900 may split the output of the first optical coupler of the ultrahigh-speed pulse train output unit. Accordingly, the second optical coupler 2910 may have two outputs. At this time, for example, a specific optical comb wavelength (e.g., $$\lambda_1 = \frac{c}{f_1})$$

of the two outputs of the second optical coupler 2910 may be filtered using the first optical filter 2920. In addition, for example, a specific optical comb wavelength (e.g., $$\lambda_2 = \frac{c}{f_2})$$

of the outputs of the second optical coupler 2920 may be filtered using the second optical filter 2930. At this time, the output signal of the second optical filter 2930 may be input to the optical modulator 2940. At this time, the optical modulator 2940 may modulate the desired baseband signal $C_1$ using the optical signal received from the second optical filter 2930.

Figure 30:
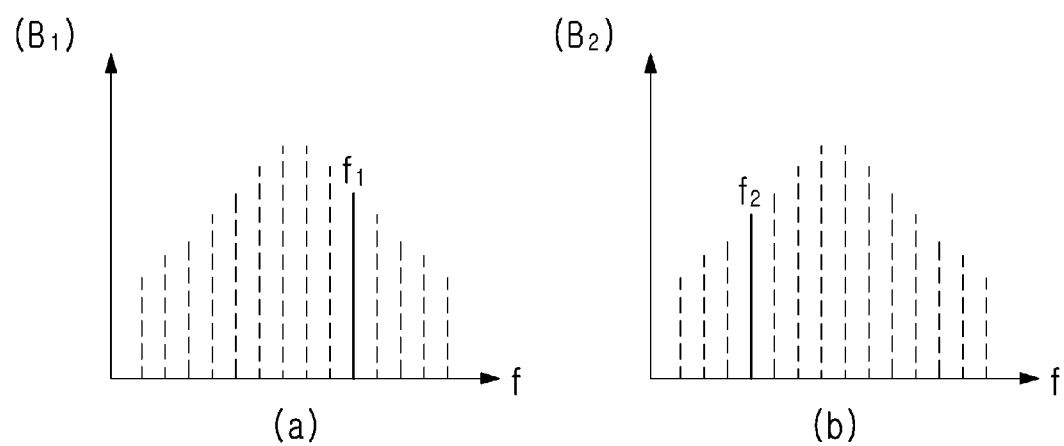
FIG. 30 is a view showing a signal applicable to the present disclosure.

Thereafter, the optical modulator 2940 may transmit the modulated signal to the third optical coupler 2950. Here, the third optical coupler 2950 may combine the output $C_2$ of the optical modulator 2940 with the output $B_1$ of the first optical filter. Thereafter, the second photodetector 2960 may convert the output $D_1$ of the third optical coupler 2950 into a sub-THz band signal $E_1$. At this time, the carrier frequency of the sub-THz band signal may be expressed by Equation 4 below.

$$f_{mm} = \frac{|\lambda_1 - \lambda_2|c}{\lambda_1 \lambda_2} = |f_1 - f_2|, \qquad \text{Equation 4}$$

where, c may denote the speed of light. At this time, for example, considering the detailed operation of the optical modulation and detection unit 2900, the optical signal $B_1$, which has passed through the first optical filter 2920, may be a signal obtained by making only a specific frequency $f_1$ pass with respect to the input signal of the optical modulation and detection unit 2900, as shown in (a) of FIG. 30. In addition, the optical signal $B_2$, which has passed through the second optical filter 2930, may be a signal obtained by making only a specific frequency $f_2$ pass with respect to the input signal of the optical modulation and detection unit 2900, as shown in (b) of FIG. 30.

Figure 31:
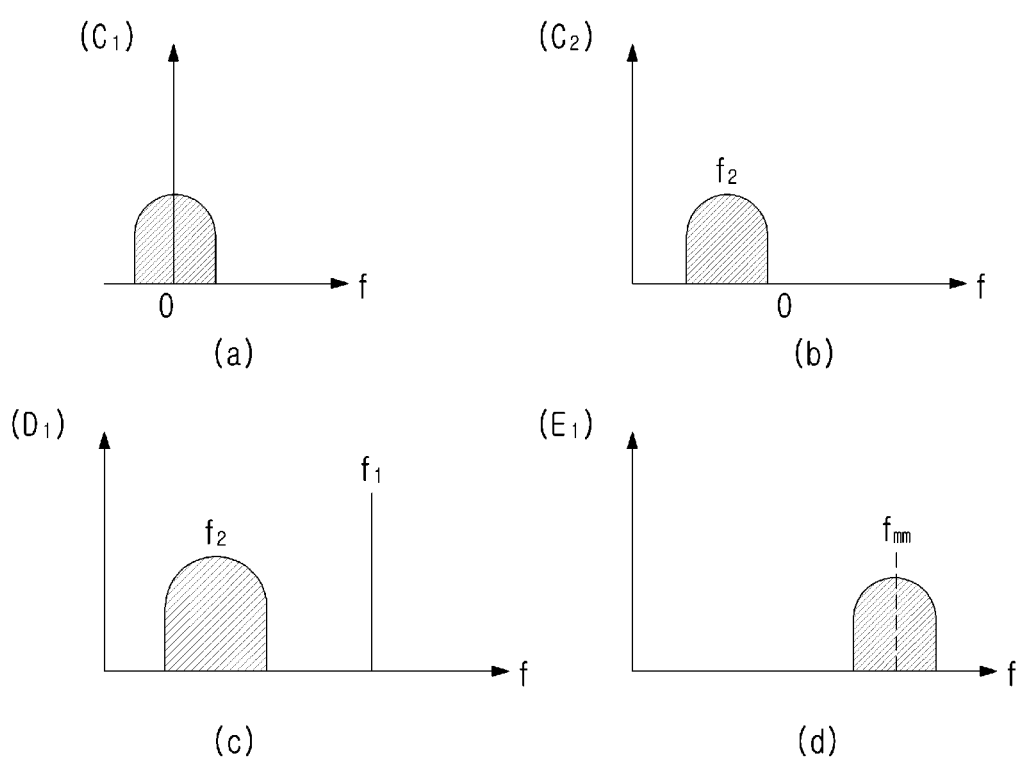
FIG. 31 is a view showing a signal applicable to the present disclosure.

In addition, for example, FIG. 31 is a view showing a signal applicable to the present disclosure. At this time, referring to FIG. 31, the baseband signal $C_1$ transferred to the optical modulator of the optical modulation and detection unit 2900 may be a data signal to be transmitted from the transmitter to the receiver. At this time, a signal having specific bandwidth in the baseband may be shown in FIG. 31(a). At this time, the signal of FIG. 31(a) may be converted into the optical signal of the optically modulated $C_2$ by carrying a signal on the center frequency of the optical signal $B_2$, which has passed through the second optical filter 2930, through the optical modulator 2940, and the converted signal is shown in FIG. 31(b).

In addition, the first optical filter 2920 of the optical modulation and detection unit 2900 may convert the signal received from the second optical coupler 2910 and transmit $B_1$ to the third optical coupler 2950. At this time, the third optical coupler 2950 may combine the signal $B_1$ with the signal $C_2$ to generate the optical signal $D_1$, which is shown in FIG. 31(c). In addition, the second photodetector 2960 of the optical modulation and detection unit 2900 may convert the optical signal $D_1$ into the sub-THz band electrical signal $E_1$, which is shown in FIG. 31(d). That is, the sub-THz band electrical signal may be generated through the above-described process.

Here, for example, considering the configuration of the optical modulation and detection unit 2900, the second optical coupler 2910 may split the ultrahigh-speed pulse train output having excellent periodicity into two and apply one to the first optical filter 2920 and the other to the second optical filter 2930. At this time, the first optical filter 2920 may serve to make a specific wavelength (e.g., $\lambda_1$) of several optical comb frequency components of the ultrahigh-speed pulse train output having excellent periodicity pass, thereby deriving $B_1$. Here, for example, the bandwidth of the first optical filter 2920 may be lower than the repetition rate $f_{rep}$ of the mode-locked laser. In addition, if the first optical filter 2920 has a peridic frequency response, the period may be sufficiently high (e.g., period>$f_{mm}$). Here, the periodic frequency response may mean that the frequency response of the optical filter is repeated for each constant frequency. At this time, for example, at least one of fiber Bragg grating filter or a Fabry-Perot filter may be used as an optical filter, without being limited thereto. However, the above-described filters may have low insertion loss and facilitate economical implementation. Meanwhile, for example, the second optical filter 2930 may serve to make a specific wavelength (e.g., $$\lambda_2 = \frac{c}{f_2})$$

of several optical comb frequency components of the ultrahigh-speed pulse train output having excellent periodicity pass. At this time, the second optical filter 2930 may derive the signal $B_2$. At this time, for example, the bandwidth of the second optical filter 2930 may be lower than the repetition rate $f_{rep}$ of the mode-locked laser. In addition, when the second optical filter 2930 has a periodic frequency response, the period may be sufficiently high (e.g., period >$f_{mm}$). At this time, the periodic frequency response may mean that the frequency response of the optical filter is repeated for each constant frequency.

Here, since the relationship of Equation 4 above may be established, in order to generate the desired sub-THZ signal frequency, $$\lambda_2 = \frac{c}{f_2}$$

may be selected in consideration of the output wavelength (that is, $$\lambda_1 = \frac{c}{f_1})$$

of the first optical filter 2920. In addition, the optical modulator 2940 may carry an ultrahigh-speed signal on light having a wavelength of $$\lambda_2 = \frac{c}{f_2}$$

For example, in the optical modulator 2940, at least one of a Mach-Zehnder modulator, an electric field absorption modulator or an IQ modulator may be used, without being limited to the above-described embodiment. In addition, the third optical coupler 2950 may be a device that combines two optical signals. In addition, the second photodetector 2960 may be a device that converts an optical signal intensity into an electrical signal.

Figure 32:
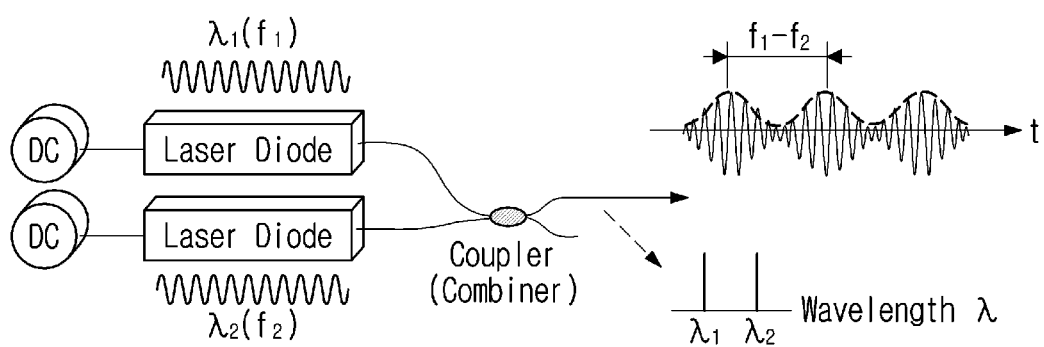
FIG. 32 is a view showing a photodetector applicable to the present disclosure.

At this time, the second photodetector 2960 may be a photodetector which operates at an ultrahigh speed enough to receive the sub-THz signal and a uni-traveling carrier photo-diode (UTC-PD) may be used as a photodetector, without being limited thereto. For example, FIG. 32 is a view showing a photodetector applicable to the present disclosure. At this time, referring to FIG. 32, when two optical signals (that is, $f_1$ and $f_2$) having different frequencies may be combined and then detected by a high-speed photodetector, a component corresponding to a difference in frequency between the optical signals, that is, a component $|f_1-f_2|$, may be derived as the output of the receiver.

Figure 33:
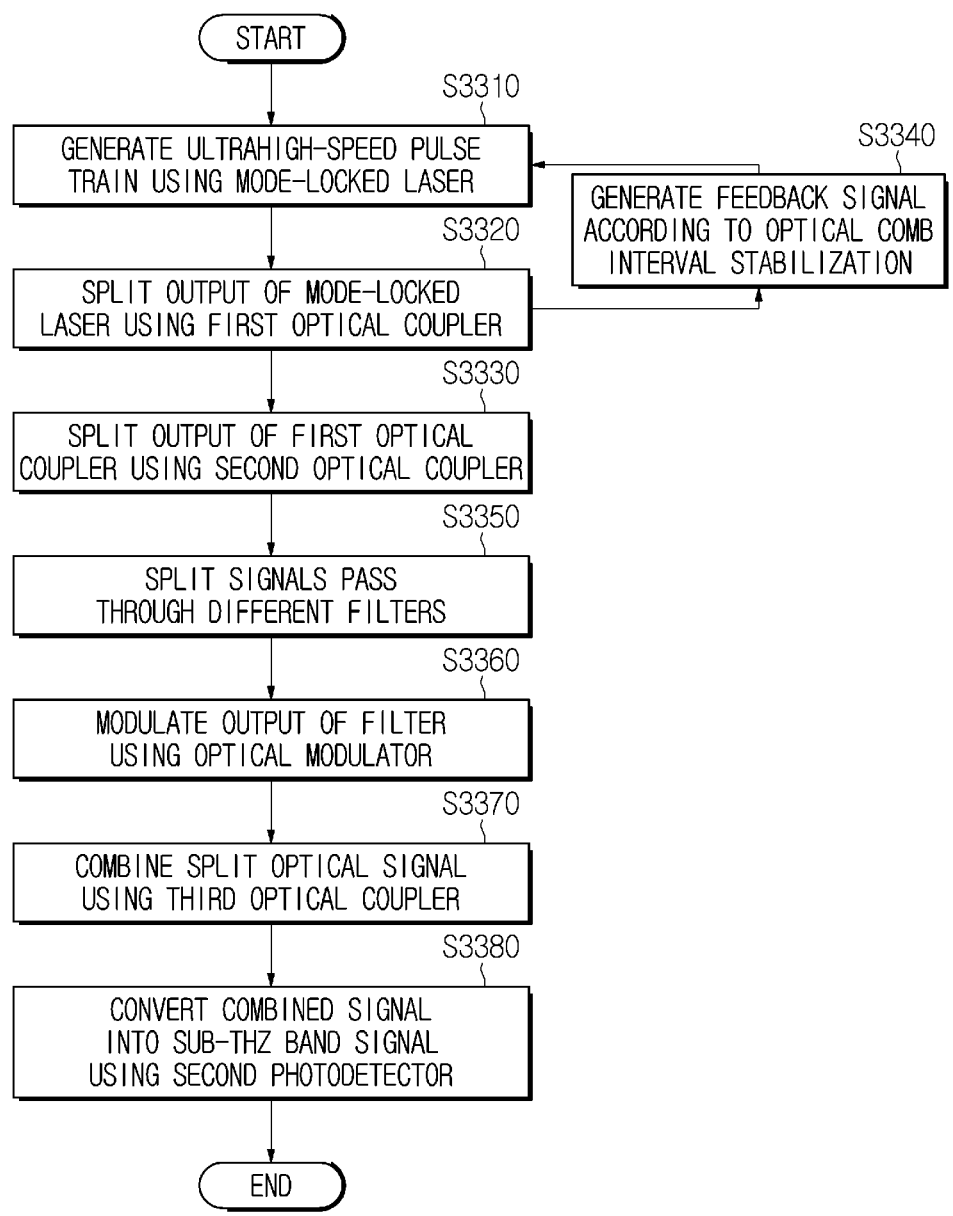
FIG. 33 is a view showing a method of generating a sub-THz band signal applicable to the present disclosure.

FIG. 33 is a view showing a method of generating a sub-THz band signal applicable to the present disclosure. Referring to FIG. 33, the optical device-based sub-THz band ultrahigh-speed signal generation apparatus may generate a sub-THz band signal. At this time, for example, the optical device-based sub-THz band ultrahigh-speed signal generation apparatus may be implemented in the UE, the base station or at least one of the device of FIGS. 4 to 9, thereby generating the sub-THz band signal. Hereinafter, the apparatus will be described for convenience of description and the present disclosure is not limited thereto and is applicable to the UE, the base station or another apparatus.

As amore specific example, the apparatus may generate a ultrahigh-speed pulse train using a mode-locked laser (S3310). Next, the apparatus may split the output of the mode-locked laser using a first optical coupler. At this time, the first optical coupler may split the output and input one split output to the second optical coupler of the optical modulation and detection unit. In addition, the first optical coupler may transfer the split output to the optical comb interval stabilization circuit through the first photodetector. At this time, the apparatus may generate a feedback signal according to optical comb interval stabilization (S3330). Here, the feedback signal may be transferred to the phase adjuster of the mode-locked laser. The mode-locked laser may adjust the phase through the transferred feedback and stabilize the signal. Thereafter, the apparatus may split the output of the first optical coupler using the second optical coupler of the optical modulation and detection unit (S3340). The split signals may pass through different filters (S3350). For example, the different filters may be a first optical filter and a second optical filter, as described above. At this time, for example, as described above, the apparatus may modulate the output of the filter through the optical modulator (S3360). Here, the baseband signal may be transferred to the optical modulator and the baseband signal may be combined with the transferred optical signal. At this time, the baseband signal may be data and may be information to be transmitted by the transmitter. That is, the data may be combined with the optical signal output through the filter in the optical modulator. Thereafter, the combined signal may be transferred to the third optical coupler. At this time, the split optical signal may be combined using the third optical coupler (S3370). That is, one of the optical signals split through the second coupler may be converted into a signal modulated with data through the optical modulator through the optical filter, and the other optical signal may be converted through the optical filter. Thereafter, as described above, the split signals may be combined, and the combined signal may be converted into a sub-THz band signal using the second photodetector (S3380). That is, after the optical signal is generated, the apparatus may carry data on the optical signal and perform transmission. Here, for example, the data may be applied through the optical modulator in the process of generating the optical signal, thereby carrying the data on the optical signal.

As another example, as the optical device-based sub-THz band ultrahigh-speed signal generation apparatus, an apparatus for mixing an output signal with a baseband electrical signal may be considered. Here, the optical device-based sub-THz band ultrahigh-speed signal generation apparatus may generate a sub-THz band signal. At this time, for example, the optical device-based sub-THz band ultrahigh-speed signal generation apparatus may be implemented in the UE, the base station or at least one of the devices of FIGS. 4 to 9, thereby generating the sub-THz band signal. Hereinafter, the apparatus will be described for convenience of description and the present disclosure is not limited thereto and is applicable to the UE, the base station or another apparatus.

Figure 34:
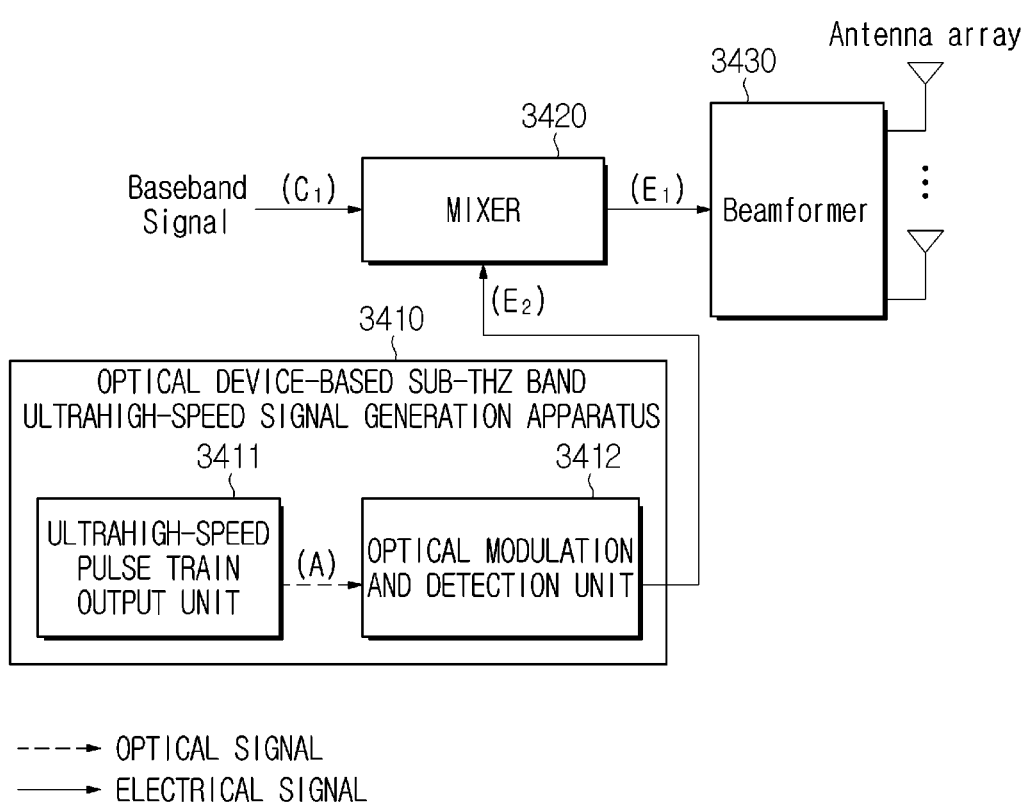
FIG. 34 is a view showing an optical device-based sub-THz band ultrahigh-speed signal generation apparatus applicable to the present disclosure.

At this time, for example, FIG. 34 is a view showing an optical device-based sub-THz band ultrahigh-speed signal generation apparatus applicable to the present disclosure. At this time, for example, the optical device-based sub-THz band ultrahigh-speed signal generation apparatus 3410 may include an ultrahigh-speed pulse train output unit 3411 and an optical modulation and detection unit 3412, as described above with reference to FIGS. 23 to 33. Here, for example, referring to FIG. 29, the baseband signal indicating data was combined with the optical signal in the optical modulator.

However, for example, in FIG. 34, the baseband signal may not be combined in the optical modulator. At this time, the optical device-based sub-THz band ultrahigh-speed signal generation apparatus 3410 may output a signal as an optical signal and transfer the output signal $E_2$ to a mixer 3420. Here, the baseband signal $C_1$ may be combined with the optical signal $E_2$ in the mixer 3420. That is, the mixer 3420 may combine $C_1$ with $E_2$ to generate a signal $E_1$, transfer the signal to a beamformer 3430, and transmit the signal through emission of the antenna array.

Figure 35:
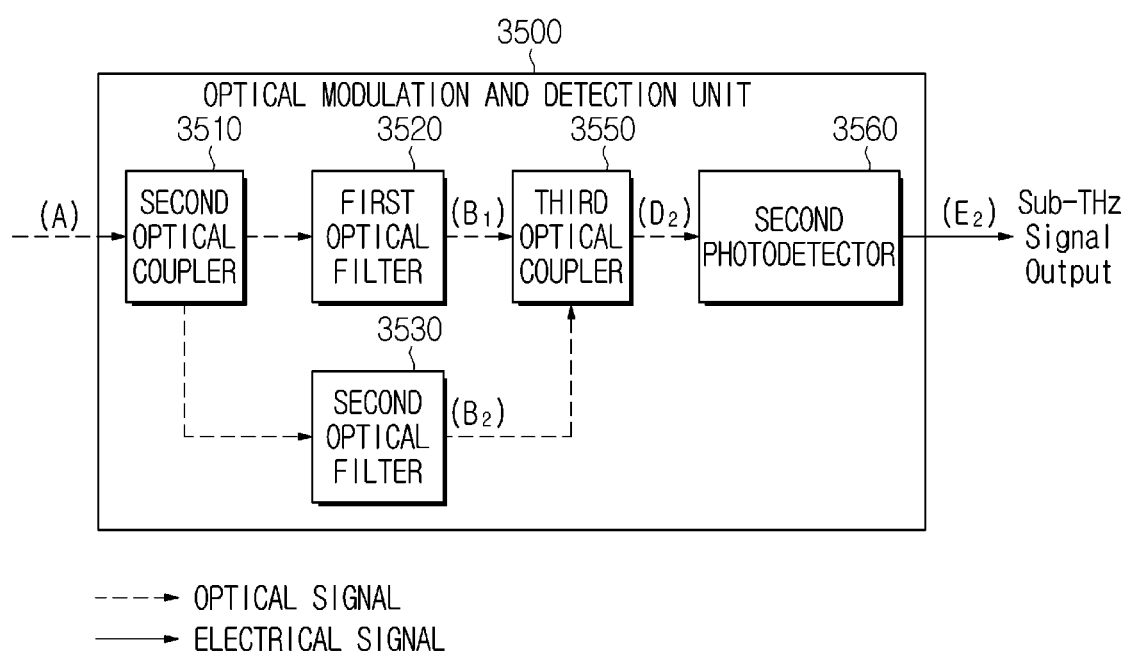
FIG. 35 is a view showing an optical modulation and detection unit applicable to the present disclosure.

In view of this, FIG. 35 is a view showing an optical modulation and detection unit applicable to the present disclosure.

For example, referring to FIG. 35, the optical modulation and detection unit 3500 may include at least one of a second optical coupler 3510, a first optical filter 3520, a second optical filter 3530, an optical modulator 3540, a third optical coupler 3550 or a second photodetector 3560. At this time, the optical modulation and detection unit 3500 may receive an optical signal from an ultrahigh-speed pulse train output unit and generate a sub-THz electrical signal $E_2$ based on the design of each detailed device.

Figure 36:
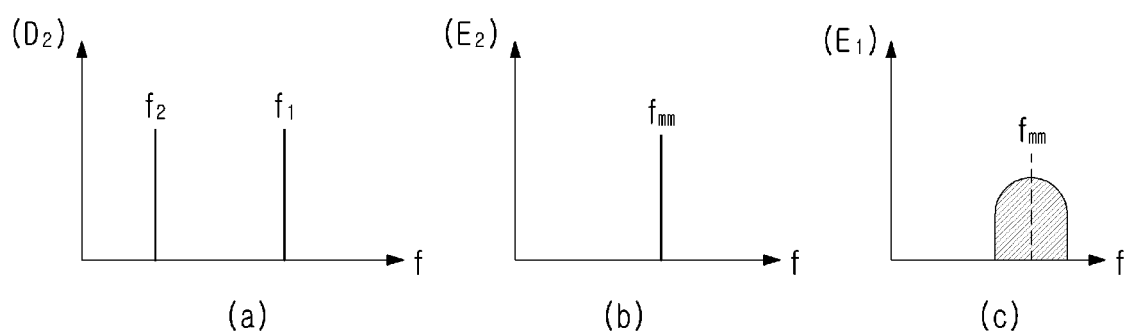
FIG. 36 is a view showing a signal applicable to the present disclosure.

More specifically, the second optical coupler 3510 of the optical modulation and detection unit 3500 may split the output from the first optical coupler of the ultrahigh-speed pulse train output unit. Accordingly, the second optical coupler 3510 may have two outputs. At this time, for example, a specific optical comb wavelength (e.g., $$\lambda_1 = \frac{c}{f_1})$$

of the two outputs of the second optical coupler 3510 may be filtered using the first optical filter 3520. In addition, for example, a specific optical comb wavelength (e.g., $$\lambda_2 = \frac{c}{f_2})$$

of the two outputs of the second optical coupler 3510 may be filtered using the second optical filter 3530. At this time, the output signal of the second optical filter 3530 may be transferred to the third optical coupler 3540. Here, unlike FIG. 29, the two outputs of the second optical coupler 3510 may pass through respective optical filters to generate two signals $B_1$ and $B_2$, and the signals may be transferred to the third optical coupler 3540. At this time, the third coupler 3540 may combine $B_1$ with $B_2$, and generate a signal $D_2$. At this time, for example, the combined signal $D_2$ is shown in FIG. 36(a). Thereafter, the third coupler 3540 may transfer the combined signal $D_2$ to the second photodetector 3550. At this time, the second photodetector 3550 may convert the output $D_2$ of the third optical coupler 3540 into a sub-THz band signal $E_2$. $E_2$ is shown in FIG. 36(b).

At this time, as described above, the mixer may carry the baseband signal $C_1$ on the sub-THz band electrical signal $E_2$. Therefore, the mixer may generate the sub-THz band electrical signal $E_1$, which is shown in FIG. 36(c). That is, the apparatus may generate the sub-THz band electrical signal $E_1$ by combining data with the optical signal as shown in FIG. 31(d). That is, in the above-described method, the apparatus may generate the optical signal, carry the baseband signal indicating data on the optical signal through the mixer, and perform transmission.

Figure 37:
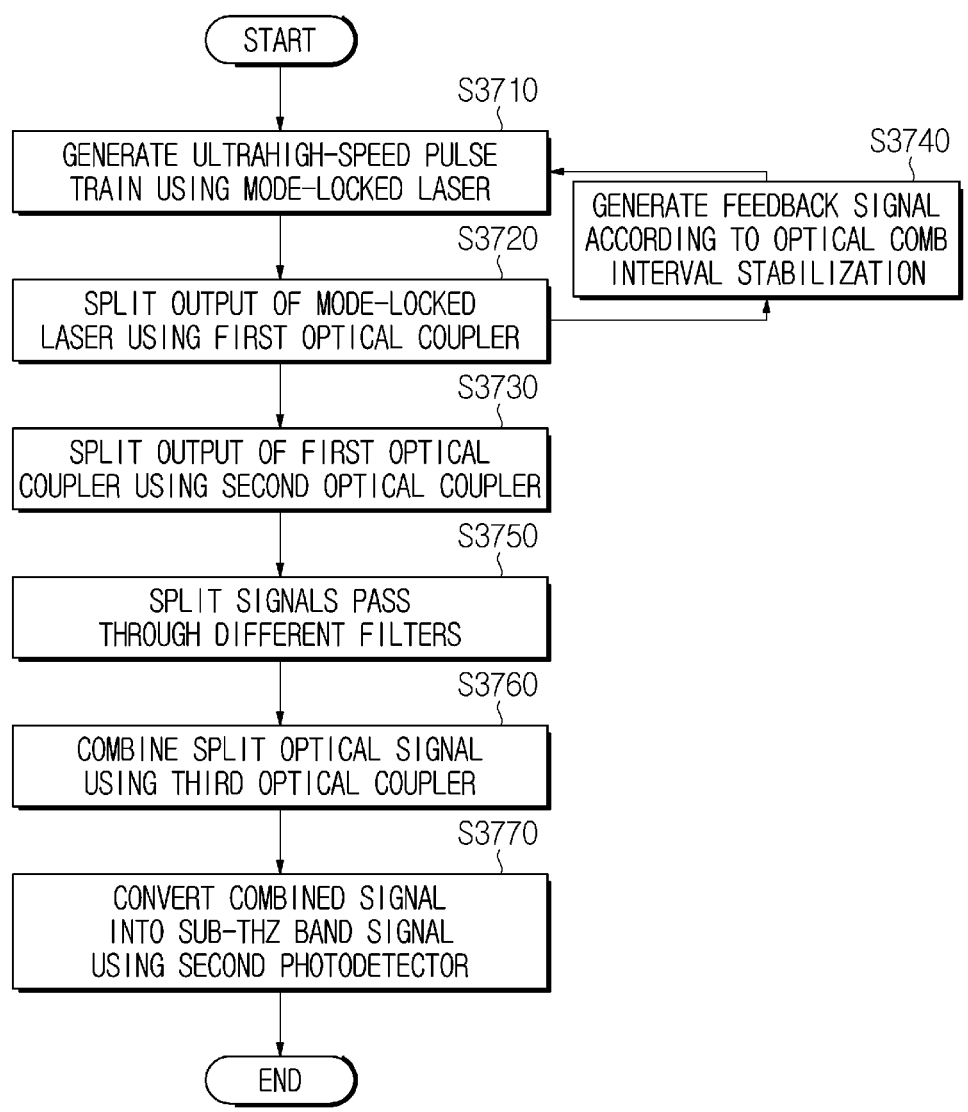
FIG. 37 is a view showing a method of generating a sub-THz band signal applicable to the present disclosure.

FIG. 37 is a view showing a method of generating a sub-THz band signal applicable to the present disclosure. Referring to FIG. 37, the optical device-based sub-THz band ultrahigh-speed signal generation apparatus may generate a sub-THz band signal. At this time, for example, the optical device-based sub-THz band ultrahigh-speed signal generation apparatus may be implemented in the UE, the base station or at least one of the device of FIGS. 4 to 9, thereby generating the sub-THz band signal. Hereinafter, the apparatus will be described for convenience of description and the present disclosure is not limited thereto and is applicable to the UE, the base station or another apparatus.

As amore specific example, the apparatus may generate a ultrahigh-speed pulse train using a mode-locked laser (S3710). Next, the apparatus may split the output of the mode-locked laser using a first optical coupler (S3720). At this time, the first optical coupler may split the output and input one split output to the second optical coupler of the optical modulation and detection unit. In addition, the first optical coupler may transfer the split output to the optical comb interval stabilization circuit through the first photodetector. At this time, the apparatus may generate a feedback signal according to optical comb interval stabilization (S3730). Here, the feedback signal may be transferred to the phase adjuster of the mode-locked laser. The mode-locked laser may adjust the phase through the received feedback and stabilize the signal. Thereafter, the apparatus may split the output of the first optical coupler using the second optical coupler of the optical modulation and detection unit (S3740). At this time, the split signal may pass through different filters (S3750). For example, the different filter may include a first optical filter, as described above. At this time, for example, as described above, the apparatus may combine the outputs of the filters through the third coupler (S3760). Thereafter, the apparatus may perform conversion into a sub-THz band signal using the signal combined through the second photodetector (S3770). At this time, as described above, the apparatus may mix the generated optical signal with data. That is, the baseband signal indicating data may be carried and transmitted on the optical signal. Here, for example, the data may be applied to the optical signal generated through the mixer, thereby carrying data on the optical signal.

In addition, the signal generated based on FIGS. 23 to 37 may be transmitted through the transmitter. At this time, the signal transmitted from the transmitter may be received by the receiver. For example, the receiver may be implemented in the UE, the base station or at least one of the devices of FIGS. 4 to 9, and is not limited to a specific device. At this time, the optical device-based sub-THz band ultrahigh-speed signal generation apparatus is equally applicable to the receiver. In the receiver, when a reference sub-THz signal is generated to down-convert a sub-THz signal into a baseband signal, the receiver may use the optical device-based sub-THz band ultrahigh-speed signal generation apparatus as the inverse structure of FIG. 34, without being limited to the above-described embodiments.

Meanwhile, for example, the transmitter and the receiver may exchange information on whether the optical device-based sub-THz band signal is used. For example, the transmitter and the receiver may exchange information on whether to carry and transmit data on the optical signal. For example, the transmitter and the receiver may exchange information on whether to use the optical signal based on a legacy communication system. More specifically, information on whether the transmitter and the receiver have capability to transmit data through the optical signal based on the optical device-based sub-THz band ultrahigh-speed signal generation apparatus may be indicated. At this time, for example, when considering communication between the base station and the UE, information on whether the optical signal is available may be indicated as UE capability information in a process of establishing RRC connection. For example, the corresponding information may be 1-bit information.

As another example, when the optical signal is used, as described above, information on whether the data is applied to the optical signal through the optical modulator or information on whether the data is applied through the mixer after generating the optical signal may be set. For example, the above-described information may be indicated through at least one of a higher layer signal or control information.

As a detailed example, when the transmitter and the receiver are respectively a base station and a UE, the above-described information may be exchanged in a process of establishing RRC connection, without being limited to the above-described embodiments.

The embodiments of the present disclosure may have the following effects.

According to the present disclosure, the UE may be implemented with a structure capable of integrating a mode-locked layer provided through a pulse train output unit having excellent periodicity.

According to the present disclosure, the UE may be implemented based on an apparatus using an optical signal.

According to the present disclosure, the UE may generate a sub-THz band signal using an optical device.

According to the present disclosure, the UE can reduce phase noise by stabilizing a timing jitter of an ultrahigh-speed pulse train.

According to the present disclosure, the UE may generate a carrier having lower phase noise than a frequency multiplication method.

According to the present disclosure, the UE may generate a broadband signal having wider modulation bandwidth than an electronic device using an optical device.

According to the present disclosure, the UE may use an ultrahigh-speed modulation device and scheme.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a 3$^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of transmitting a signal of a user equipment (UE) in a wireless communication system, the method comprising:
   generating a first optical signal related to data transmission based on an ultrahigh-speed pulse;
   converting the generated first optical signal into a second optical signal based on at least one optical filter;
   transferring the converted second optical signal and an electrical signal for the data to a mixer;
   combining the second optical signal with the electrical signal for the data in the mixer to produce a combined signal; and
   transmitting the combined signal.

2. The method of claim 1, wherein the first optical signal is converted into the second optical signal further based on an optical modulator.

3. The method of claim 1,
   wherein the combined signal is transmitted based on a beamformer and an antenna array.

4. The method of claim 1,
   wherein the UE exchanges, with a base station, capability information on whether the data transmission is possible based on an optical signal; and
   wherein the data transmission is performed based on the optical signal based on the capability information.

5. The method of claim 4,
   wherein the UE exchanges, with the base station, information on whether to combine the electrical signal for the data in a process of generating the optical signal or information on whether to combine the electrical signal for the data after generating the optical signal, and
   wherein the data transmission is performed based on the optical signal according to the exchanged information.

6. A user equipment (UE) for transmitting a signal in a wireless communication system, the UE comprising:
   at least one transmitter;
   at least one receiver;
   at least one processor; and
   at least one memory operatively connected to the at least one processor to store instructions for enabling the at least one processor to perform specific operation when executed,
   wherein the specific operation comprises:
   generating a first optical signal related to data transmission based on an ultrahigh-speed pulse;
   converting the generated first optical signal into a second optical signal based on at least one optical filter;
   transferring the converted second optical signal and an electrical signal for the data to a mixer;
   combining the second optical signal with the electrical signal for the data in the mixer to produce a combined signal; and
   transmitting the combined signal.

7. The UE of claim 6,
   wherein the UE operates based on an optical device-based sub-terahertz (sub-THz) band ultrahigh-speed signal generation apparatus, and
   wherein the optical device-based sub-THz band ultrahigh-speed signal generation apparatus generates an ultrahigh-speed pulse train, optically modulates the generated ultrahigh-speed pulse train, and generates a sub-THz band ultrahigh-speed signal.

8. The UE of claim 6, wherein the UE communicates with at least one of a mobile terminal, a network, or an autonomous vehicle other than a vehicle including the UE.

\* \* \* \* \*